(12) United States Patent
Priest et al.

(10) Patent No.: US 9,625,796 B2
(45) Date of Patent: Apr. 18, 2017

(54) DUAL RETENTION APPARATUS

(71) Applicant: CHRISTIE DIGITAL SYSTEMS USA, INC., Cypress, CA (US)

(72) Inventors: Lee Priest, Guelph (CA); Dustin Teschke, Kitchener (CA); David Graff, Kitchener (CA)

(73) Assignee: CHRISTIE DIGITAL SYSTEMS USA, INC., Cypress, CA (US)

(*) Notice: Subject to any disclaimer, the term of this patent is extended or adjusted under 35 U.S.C. 154(b) by 407 days.

(21) Appl. No.: 14/272,788

(22) Filed: May 8, 2014

(65) Prior Publication Data
US 2015/0323853 A1    Nov. 12, 2015

(51) Int. Cl.
*G03B 17/14* (2006.01)
*G03B 21/14* (2006.01)
*G03B 17/12* (2006.01)

(52) U.S. Cl.
CPC .......... *G03B 21/145* (2013.01); *G03B 17/12* (2013.01); *G03B 17/14* (2013.01); *Y10T 24/45251* (2015.01); *Y10T 403/7007* (2015.01); *Y10T 403/7015* (2015.01)

(58) Field of Classification Search
CPC ...... G03B 17/12; G03B 17/14; G03B 21/145; Y10T 24/45251; Y10T 403/7005; Y10T 403/7007; Y10T 403/7015

USPC .......... 403/348, 349, 353; 24/594.1
See application file for complete search history.

(56) References Cited

U.S. PATENT DOCUMENTS

| | | | | |
|---|---|---|---|---|
| 2,643,581 A | * | 6/1953 | Wehrenfennig | G03B 17/12 403/349 |
| 7,567,290 B2 | * | 7/2009 | Tokiwa | G03B 17/14 348/335 |
| 8,274,601 B2 | * | 9/2012 | Hsieh | G03B 17/12 348/335 |
| 2008/0106616 A1 | * | 5/2008 | Nagata | G03B 17/12 348/231.99 |

* cited by examiner

*Primary Examiner* — Josh Skroupa
(74) *Attorney, Agent, or Firm* — Perry + Currier, Inc.

(57) ABSTRACT

A dual retention apparatus comprises: a locking pin; a pin retaining device, the pin slidable therein, comprising: a starting pin position; a pin locking mechanism; a partial pin locking mechanism; a pin path from the starting pin position to the pin locking mechanism, the partial pin locking mechanism located on the pin path and configured to prevent the pin from sliding back towards the starting pin position and allowing the pin to slide towards the pin locking mechanism, the pin locking mechanism configured to lock the pin therein; and a pin return path from the pin locking mechanism to the starting position, the pin return path bypassing the partial pin locking mechanism; and, a biasing device configured to relatively bias the pin along at least a portion of the pin path towards the pin locking mechanism, and further bias the pin into the pin locking mechanism.

20 Claims, 19 Drawing Sheets

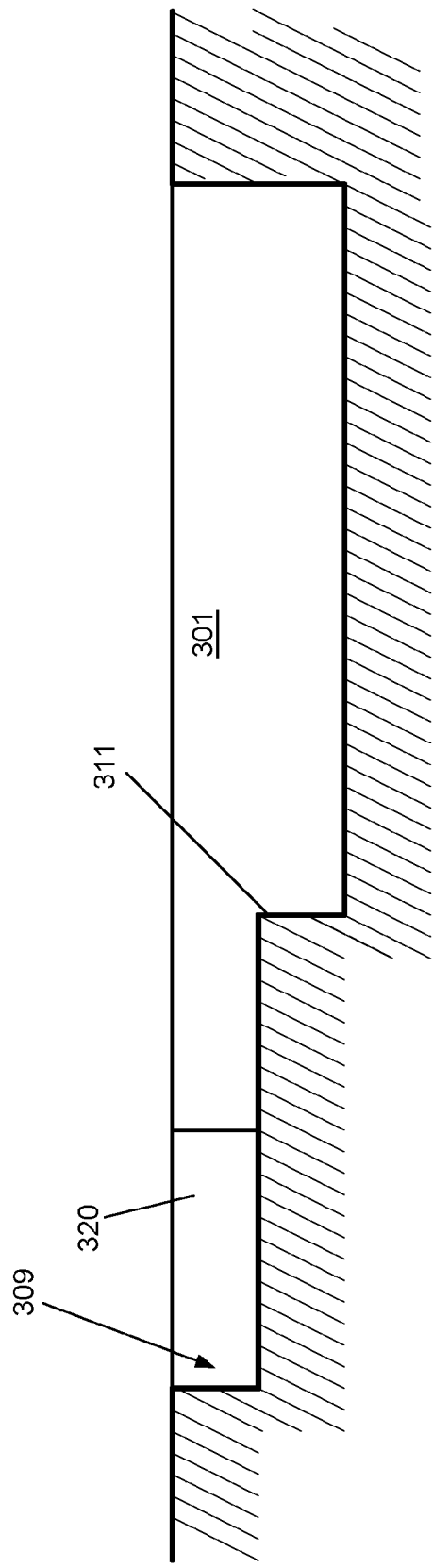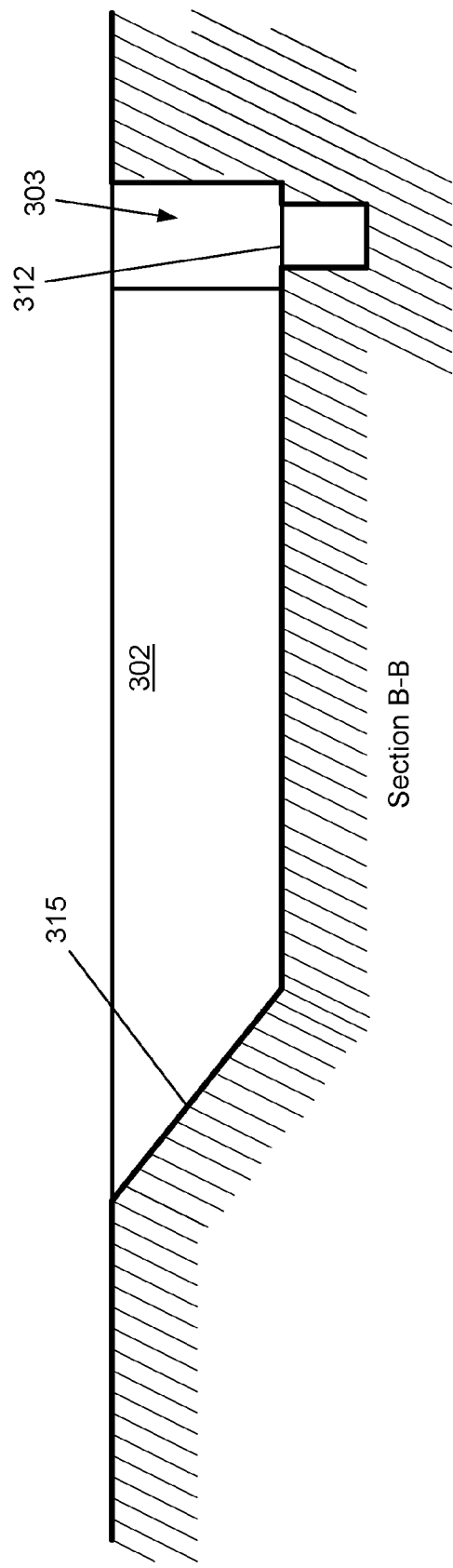

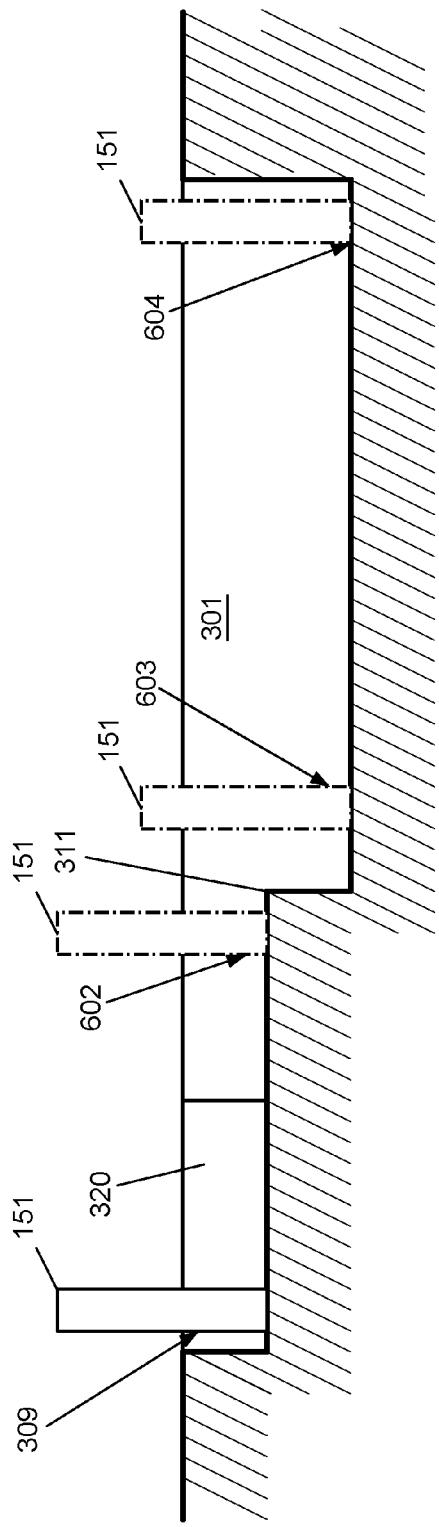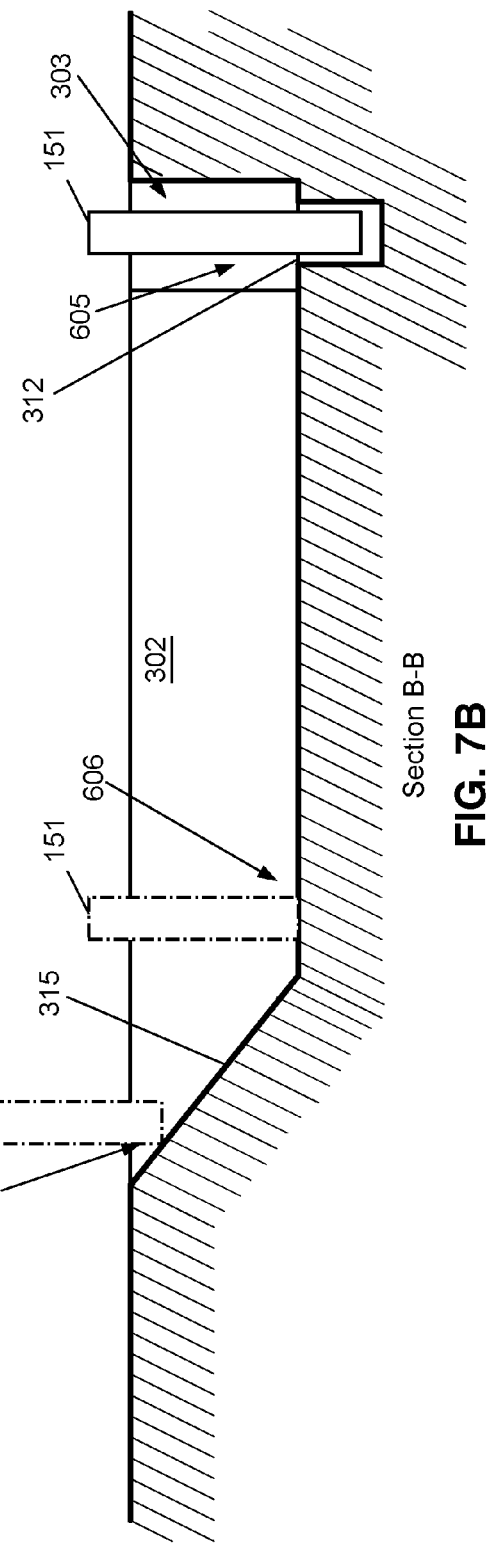
FIG. 7A  Section A-A
FIG. 7B  Section B-B

DUAL RETENTION APPARATUS

FIELD

The specification relates generally to locking devices, and specifically to a dual retention apparatus.

BACKGROUND

An inherent problem with bayonet-style lens lock mechanisms is that the lens must be fully rotated to a fully locked position in order to ensure it is safely retained. If it is not rotated to the fully locked in position, a lock pin, locking blades, and the like, are not engaged, thus vibrations (for example, either internal or external to a device to which the lens is attached, such as a projector) may cause it to rotate and fall out of a lens mount. This is a serious safety concern in a rental staging environment where projectors are flown above an audience.

SUMMARY

In general, this disclosure is directed to a dual retention apparatus that can be integrated with a bayonet style lens mount, but can also be used with other types of mounting devices that slide in order to attach a first portion to a second portion (e.g. linear and/or rotational sliding). The dual retention apparatus includes a locking pin and a pin retaining device, the pin retaining device comprising: a starting pin position; a pin locking mechanism; a partial pin locking mechanism; a pin path from the starting pin position to the pin locking mechanism, the partial pin locking mechanism located on the pin path and configured to prevent the locking pin from sliding back towards the starting pin position and allowing the locking pin to slide towards the pin locking mechanism, the pin locking mechanism configured to lock the locking pin therein; and a pin return path from the pin locking mechanism to the starting position, the pin return path bypassing the partial pin locking mechanism. A biasing device relatively biases the pin towards and into the pin locking mechanism. As the first portion and the second portion of the mounting device are mated and rotated and/or slid, relative to one another, from an unlocked position towards a locking position, the locking pin slides from the starting pin position past the partial pin locking mechanism that prevents the locking pin from sliding back towards the starting pin position. The partial pin locking mechanism is located at a position on the pin path where the first portion is retained by the second portion (or vice versa) but is not in the locked position; hence, even if the first portion and the second portion are not fully rotated and/or slid into the locking position the partial pin locking mechanism prevents the first portion from rotating and/or sliding back towards the unlocked position. In any event, once the locking pin is rotated and/or slid past the partial pin locking mechanism to the pin locking mechanism, a biasing device relatively biases the pin towards a pin locking mechanism on the return pin path, the pin locking mechanism retaining and/or engaging the locking pin in the locked position, thereby locking the first portion and the second portion in a use position. The biasing device further relatively biases the locking pin to engage the pin locking mechanism. To unlock first portion from the second portion, a pin unlocking mechanism is engaged, for example by a user, so that the pin is no longer retained by the pin locking mechanism. The first portion and the second portion are rotated and/or slid back towards the unlocked position, and the locking pin slides in the return pin path back towards the starting pin position bypassing the partial pin locking mechanism, the starting pin position being coincident with the unlocked position of the first portion and the second portion.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XYY, YZ, ZZ, and the like). Similar logic can be applied for two or more items in any occurrence of "at least one . . . " and "one or more . . . " language.

An aspect of the specification provides an apparatus comprising: a locking pin; a pin retaining device, the locking pin slidable therein, comprising: a starting pin position; a pin locking mechanism; a partial pin locking mechanism; a pin path from the starting pin position to the pin locking mechanism, the partial pin locking mechanism located on the pin path and configured to prevent the locking pin from sliding back towards the starting pin position and allowing the locking pin to slide towards the pin locking mechanism, the pin locking mechanism configured to lock the locking pin therein; and a pin return path from the pin locking mechanism to the starting position, the pin return path bypassing the partial pin locking mechanism; and, a biasing device configured to relatively bias the locking pin along at least a portion of the pin path towards the pin locking mechanism, and further bias the locking pin into the pin locking mechanism.

The pin path can comprise: a first pin path comprising: the starting pin position, and a connecting pin path connecting the first pin path to the return pin path; and, the return pin path comprising: the pin locking mechanism, and a pin return mechanism configured to return the locking pin to the starting pin position. The pin return mechanism can comprise a ramp located at an end of the return pin path, the ramp configured to guide the locking pin to the starting pin position as the locking pin is sliding along the return pin path. The connecting path can be about perpendicular to each of the first pin path and the return pin path.

The biasing device can one or more of bias: the locking pin towards the pin retaining device; and the pin retaining device towards the locking pin.

The pin path can comprise a tapered entry configured to guide the locking pin from the starting pin position towards the partial pin locking mechanism, as the locking pin slides along the pin path.

The partial pin locking mechanism can be located towards the starting pin position on the pin path.

The partial pin locking mechanism can comprise a step in the pin path, the step being about parallel to the pin locking mechanism so that as the locking pin slides along the pin path, the biasing device biases the locking pin towards the step, the step preventing the locking pin from sliding back towards the starting pin position once the locking pin slides past the step.

The pin locking mechanism can comprise a hole configured to receive the locking pin.

The pin locking mechanism can be located at an intersection of the pin path and the return pin path.

The apparatus can further comprise a pin unlocking mechanism configured to manually remove the locking pin from the pin locking mechanism so that the locking pin can slide along the return pin path towards the starting pin position. The pin unlocking mechanism can be further configured to manually bypass the partial pin locking mechanism so that the locking pin can slide along the pin path towards the starting pin position.

Each of the pin path and the return pin path can be substantially linear.

Each of the pin path and the return pin path can be at least partially arc-shaped.

The pin path and the return pin path can be substantially concentric so that the locking pin slides in a first direction along the pin path towards the locking mechanism, then along the return pin path from the locking mechanism back to the starting pin position.

The locking pin, the pin retaining device, and the biasing device can each be components of a bayonet-style lens mount, the partial pin locking mechanism preventing a lens in the bayonet-style lens mount from rotating back to an unlocked position, and the pin locking mechanism locking the lens in the bayonet-style lens mount into a locked position.

Each of the pin path and the return pin path can comprise respective concentric cam slots.

The starting pin position and a first portion of the pin path, prior to the partial pin locking mechanism, can be on a first level, and a remainder of the pin path and at least a portion of the return pin path, can be on a second level deeper than the first level.

The apparatus can further comprise a pin return mechanism on the return pin path configured to return the locking pin from the second level to the first level as the locking pin slides there along.

The locking pin can comprise a shaft and a cross portion; the pin path can comprise: a surface along which the cross portion slides, the partial pin locking mechanism can comprise a step in the surface preventing the cross portion from sliding back towards the starting pin position once the locking pin slides past the step; and one or more of a ramp and a step from the surface to the pin locking mechanism. The return pin path can comprise a ledge located after the pin locking mechanism and a slot in the pin path, the pin locking mechanism located in the ledge, the slot running from the pin locking mechanism to the starting pin position, the slot configured to receive: a tip of the shaft as the cross portion is sliding along the surface of the pin path; and the shaft when the locking pin is sliding along the return pin path towards the starting pin position, the slot being substantially perpendicular to the step. The biasing device can be further configured to rotationally bias the cross portion to be about parallel to the step. The apparatus can further comprise a pin unlocking mechanism configured to remove the locking pin from the pin locking mechanism and rotate the cross portion about 90° so that the cross portion can enter the slot along the return pin path.

BRIEF DESCRIPTIONS OF THE DRAWINGS

For a better understanding of the various implementations described herein and to show more clearly how they may be carried into effect, reference will now be made, by way of example only, to the accompanying drawings in which.

Figure 3:
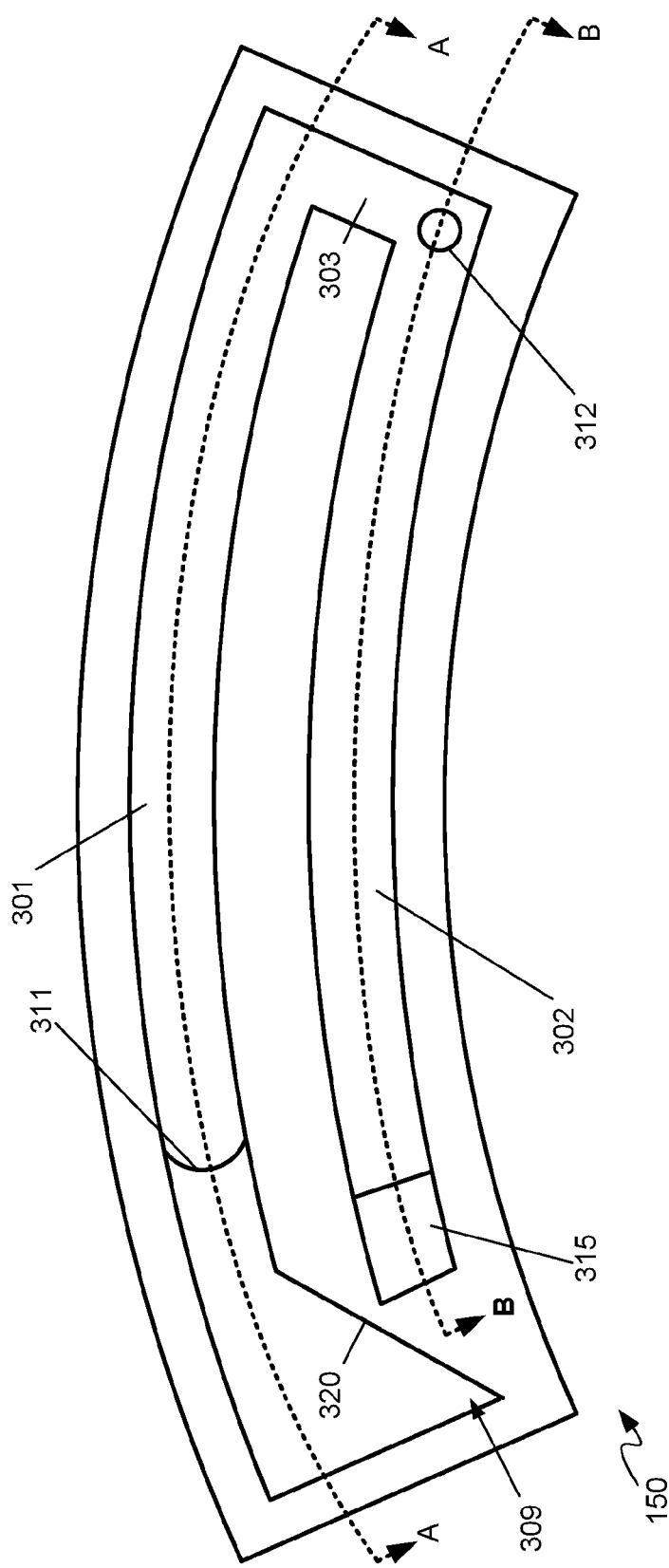
FIG. 3 depicts a front elevation view of the pin retaining device of FIG. 2 in detail, according to non-limiting implementations.

FIG. 4A and FIG. 4B respectively depict cross-sections of the pin retaining device of FIG. 3 along lines A-A and B-B, according to non-limiting implementations.

Figure 5:
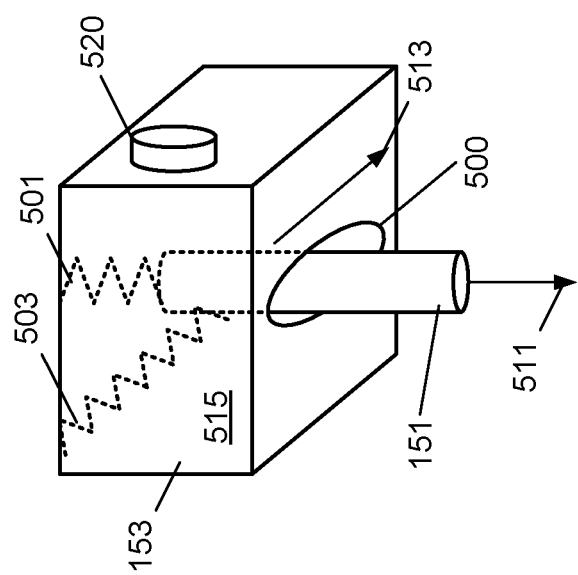

FIG. 5 depicts a perspective view of a schematic of locking pin and biasing device of the dual retention apparatus, according to non-limiting implementations.

Figure 6:
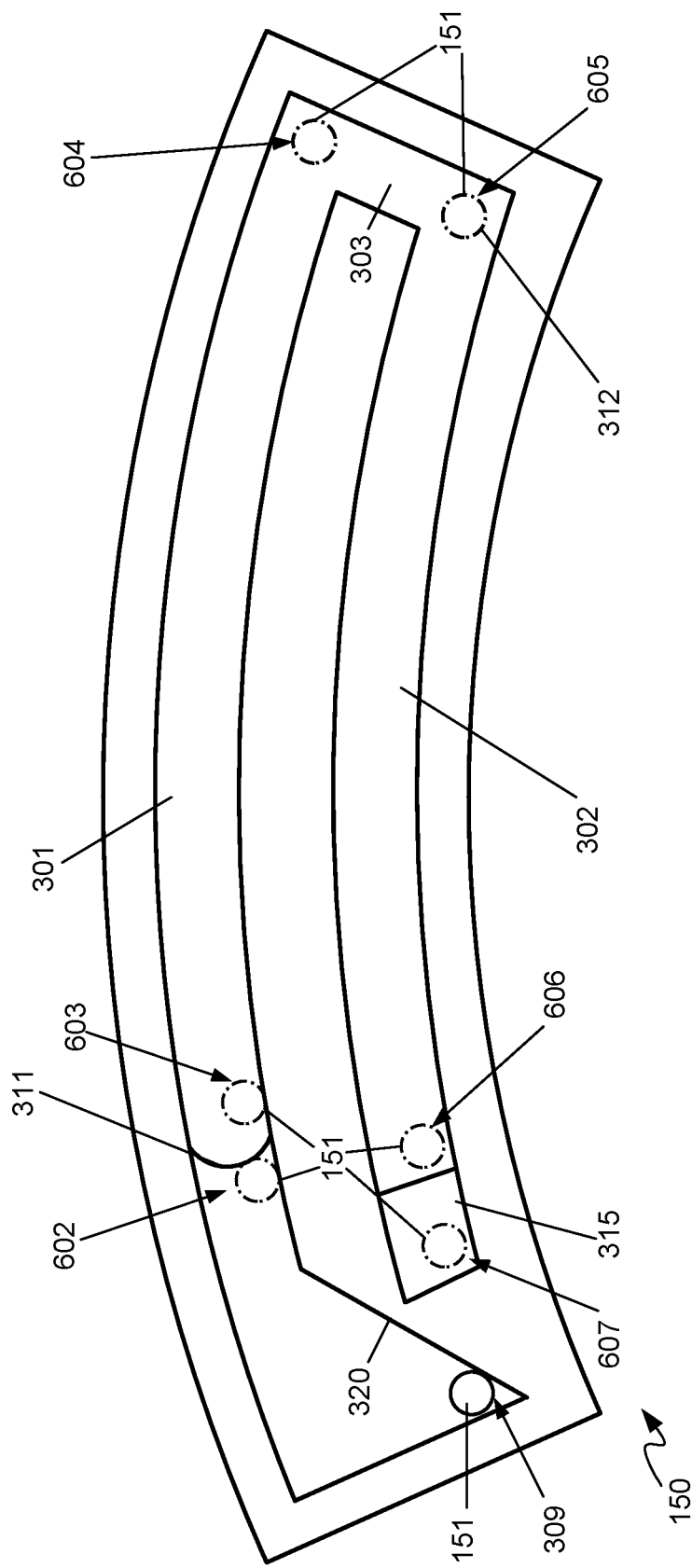

FIG. 6 depicts relative positions of the locking pin on a front elevation view of pin retaining device as the first portion and the second portion rotate and/or slide relative to one another, according to non-limiting implementations.

FIG. 7A and FIG. 7B depict relative positions of the locking pin on a cross-sectional view of pin retaining device as the first portion and the second portion rotate and/or slide relative to one another, according to non-limiting implementations.

Figure 8:
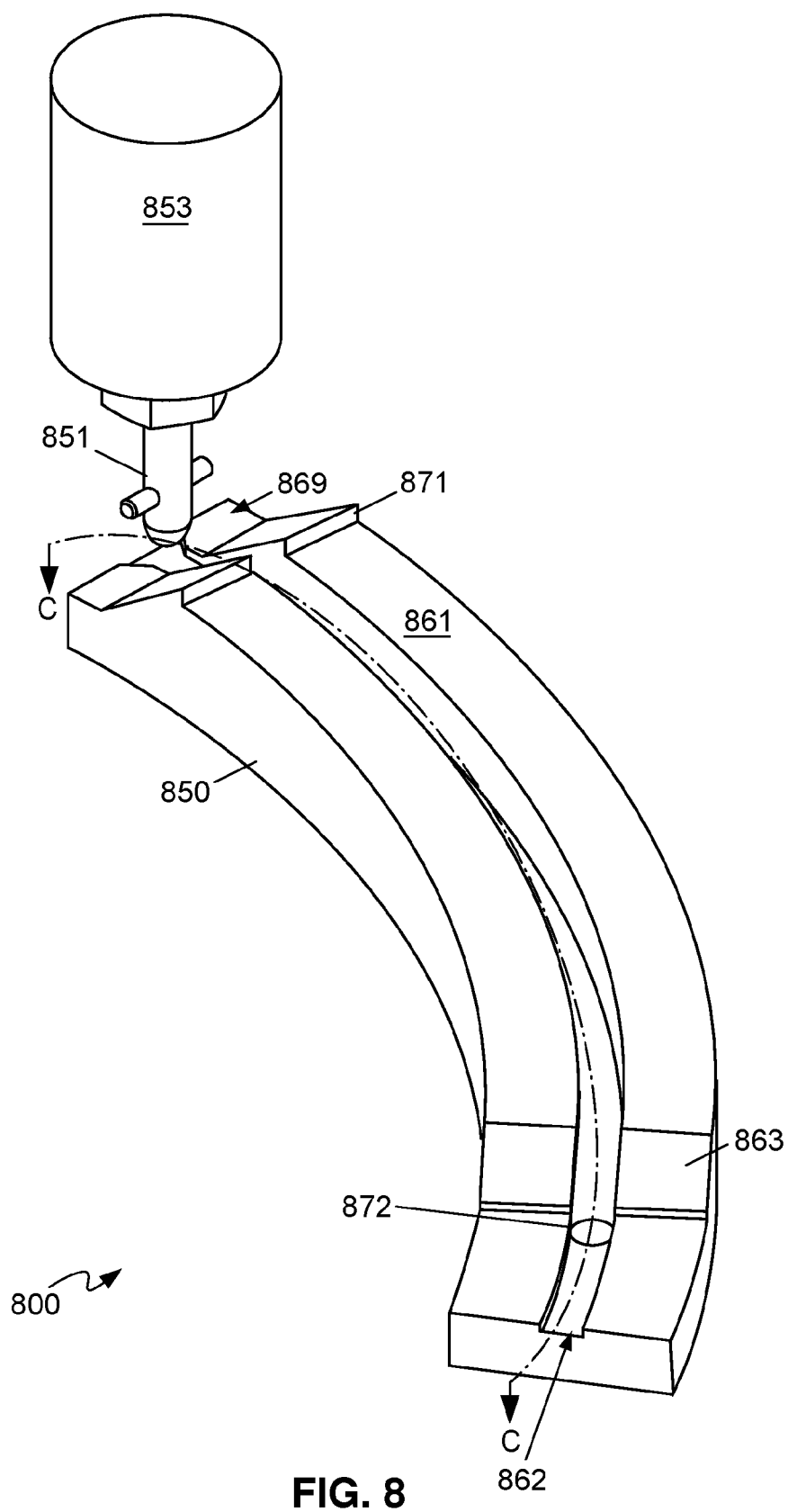

FIG. 8 depicts a perspective view of a dual retention apparatus, according to alternative non-limiting implementations.

Figure 9:
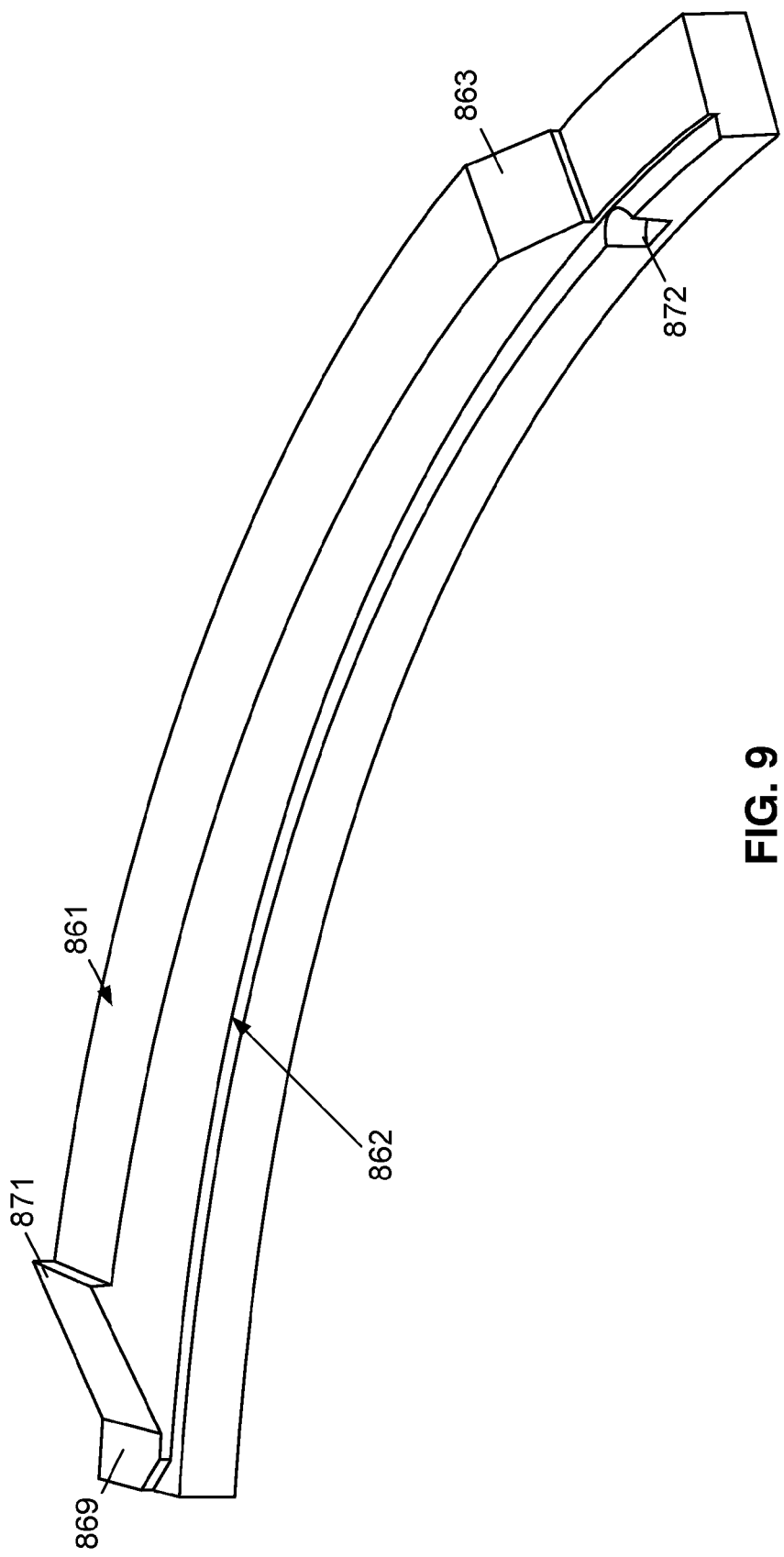

FIG. 9 depicts a cross-section of the pin retaining device of FIG. 8 along line C-C, according to non-limiting implementations.

Figure 10:
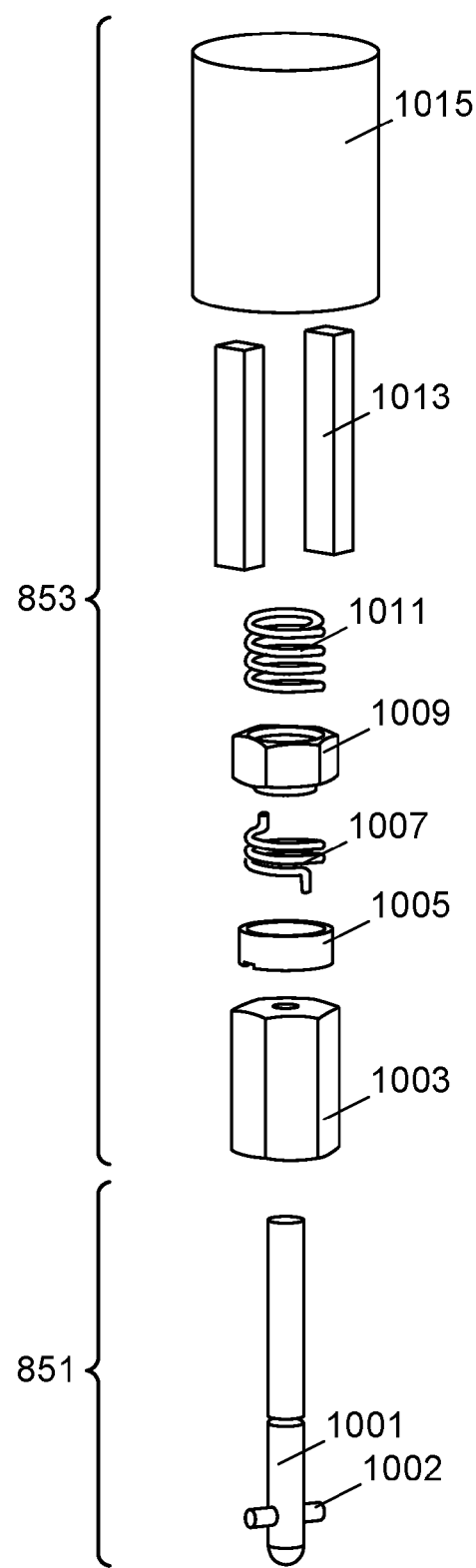

FIG. 10 depicts an exploded view of the locking pin and the biasing device of FIG. 8, according to non-limiting implementations.

Figure 11:
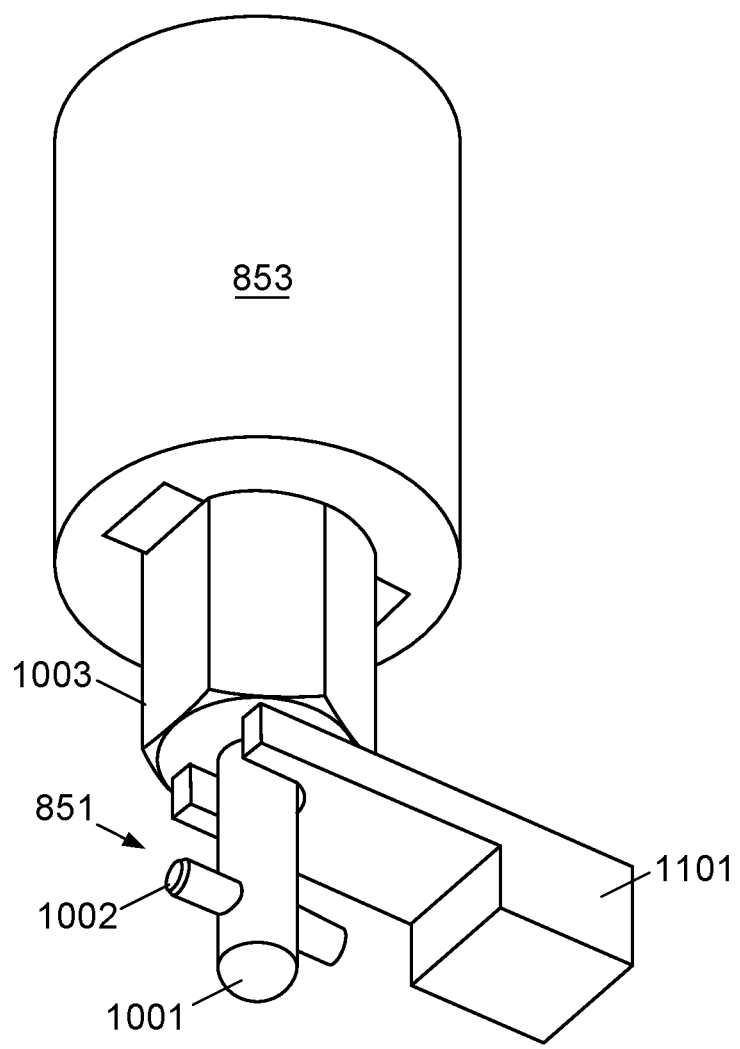

FIG. 11 depicts a perspective view of a pin unlocking mechanism interacting with the locking pin and the biasing device of FIG. 8, according to non-limiting implementations.

Figure 12:
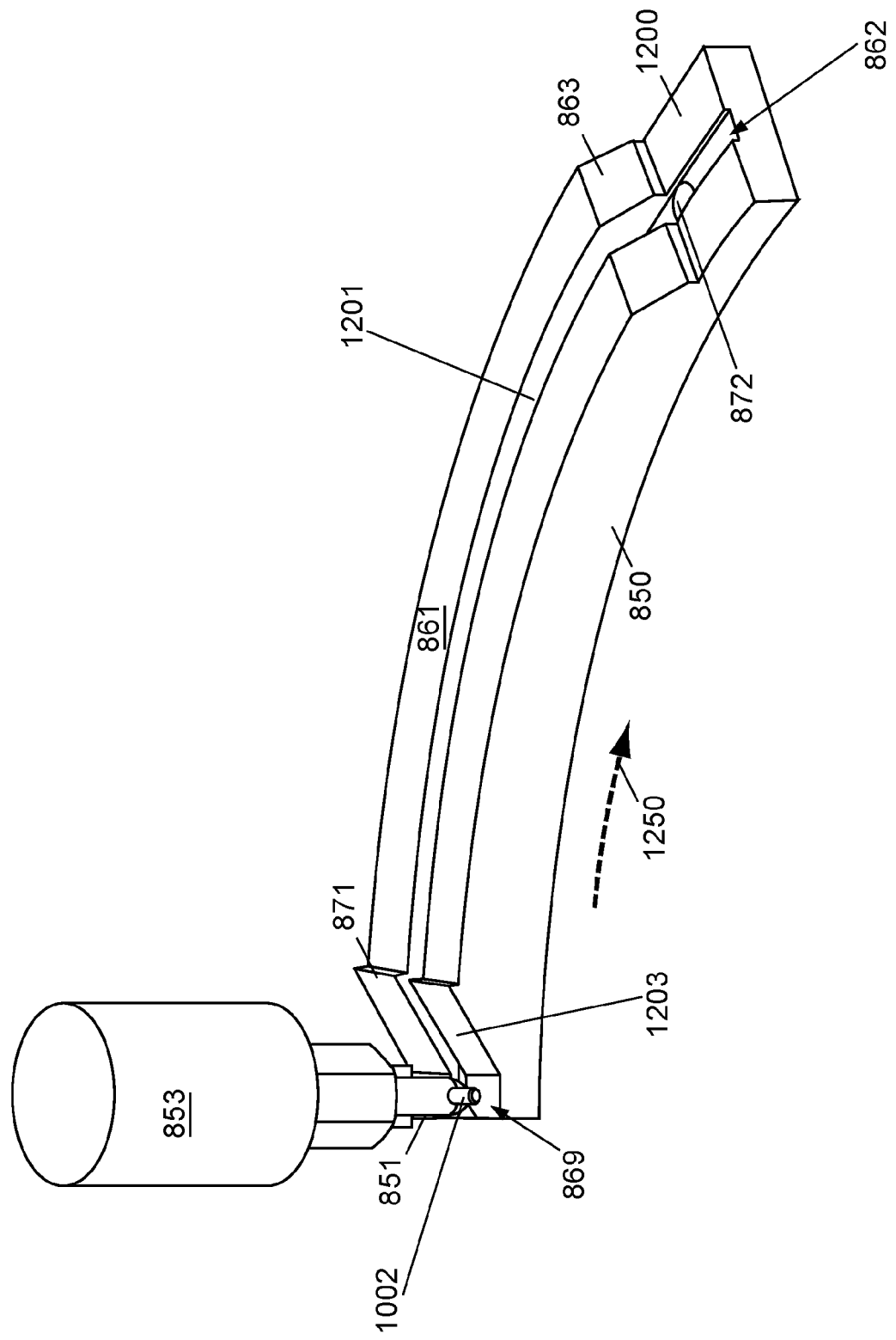

FIG. 12 depicts a perspective view of the locking pin in a starting position relative to the pin retaining device of FIG. 8, according to non-limiting implementations.

Figure 13:
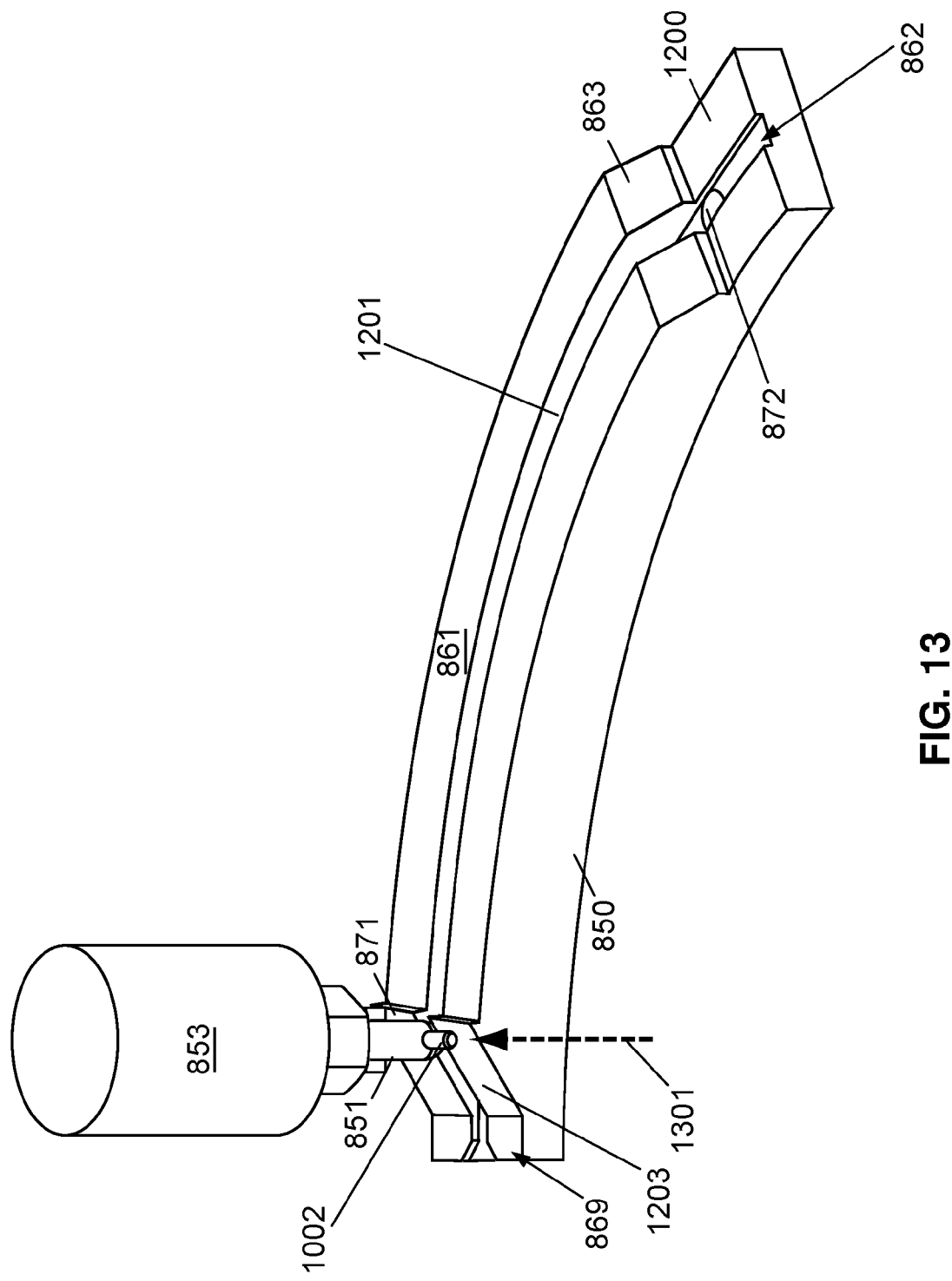

FIG. 13 depicts a perspective view of the locking pin rotating and/or sliding towards a partial pin locking mechanism of the pin retaining device of FIG. 8, according to non-limiting implementations.

Figure 14:
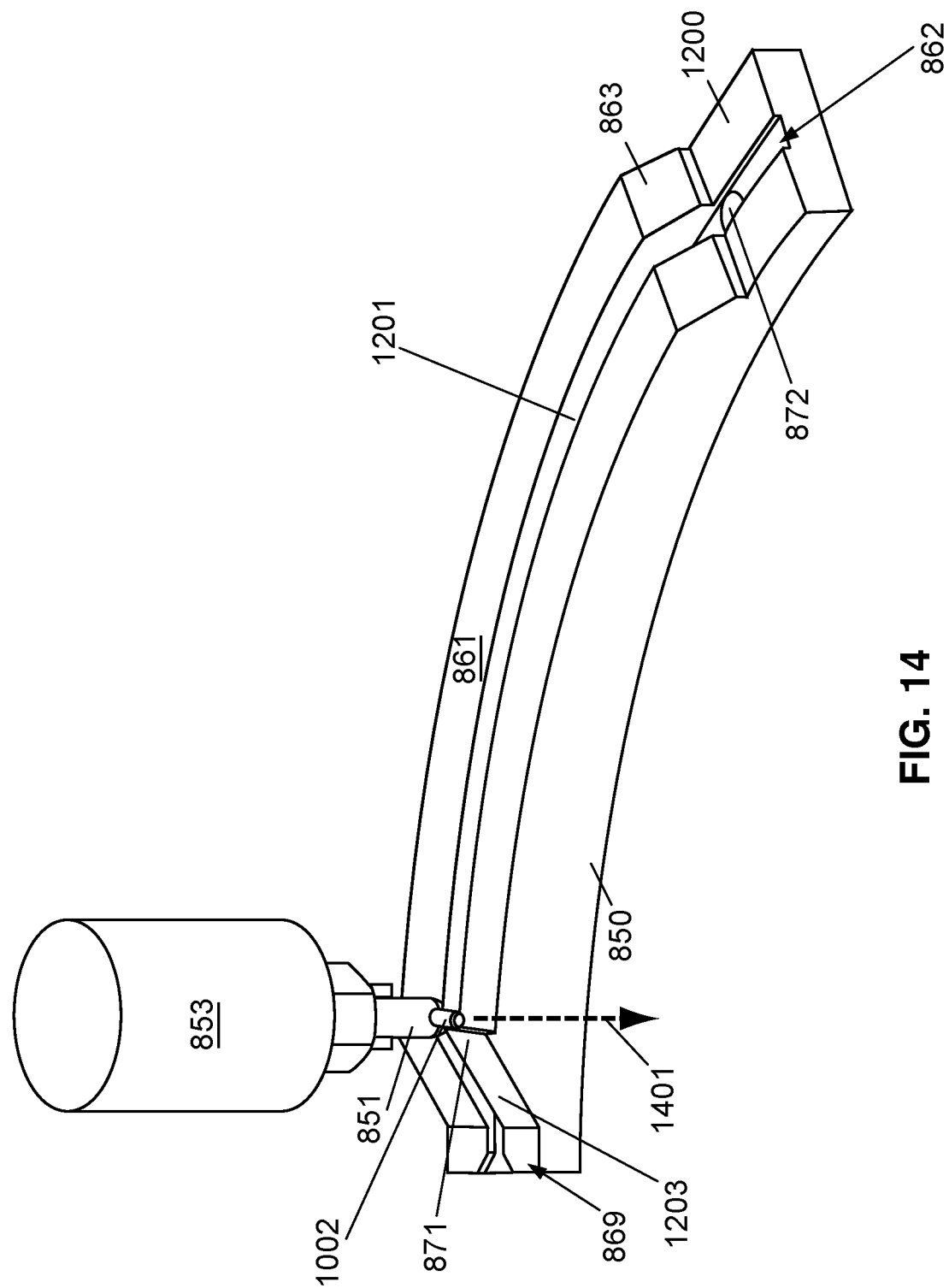

FIG. 14 depicts a perspective view of the locking pin rotating and/or sliding past the partial pin locking mechanism of the pin retaining device of FIG. 8, according to non-limiting implementations.

Figure 15:
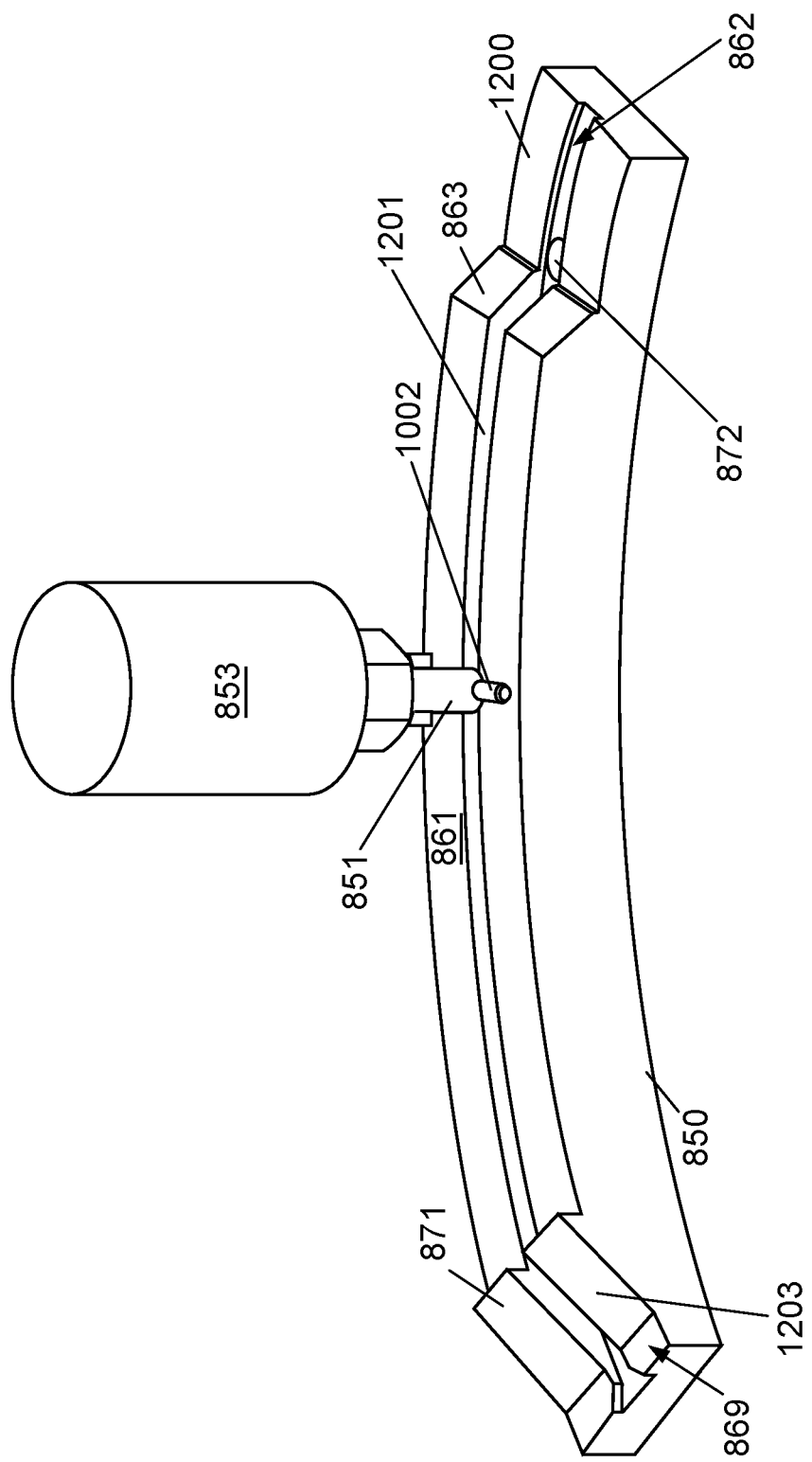

FIG. 15 depicts a perspective view of the locking pin rotating and/or sliding along a first pin path towards a connecting pin path of the pin retaining device of FIG. 8, according to non-limiting implementations.

Figure 16:
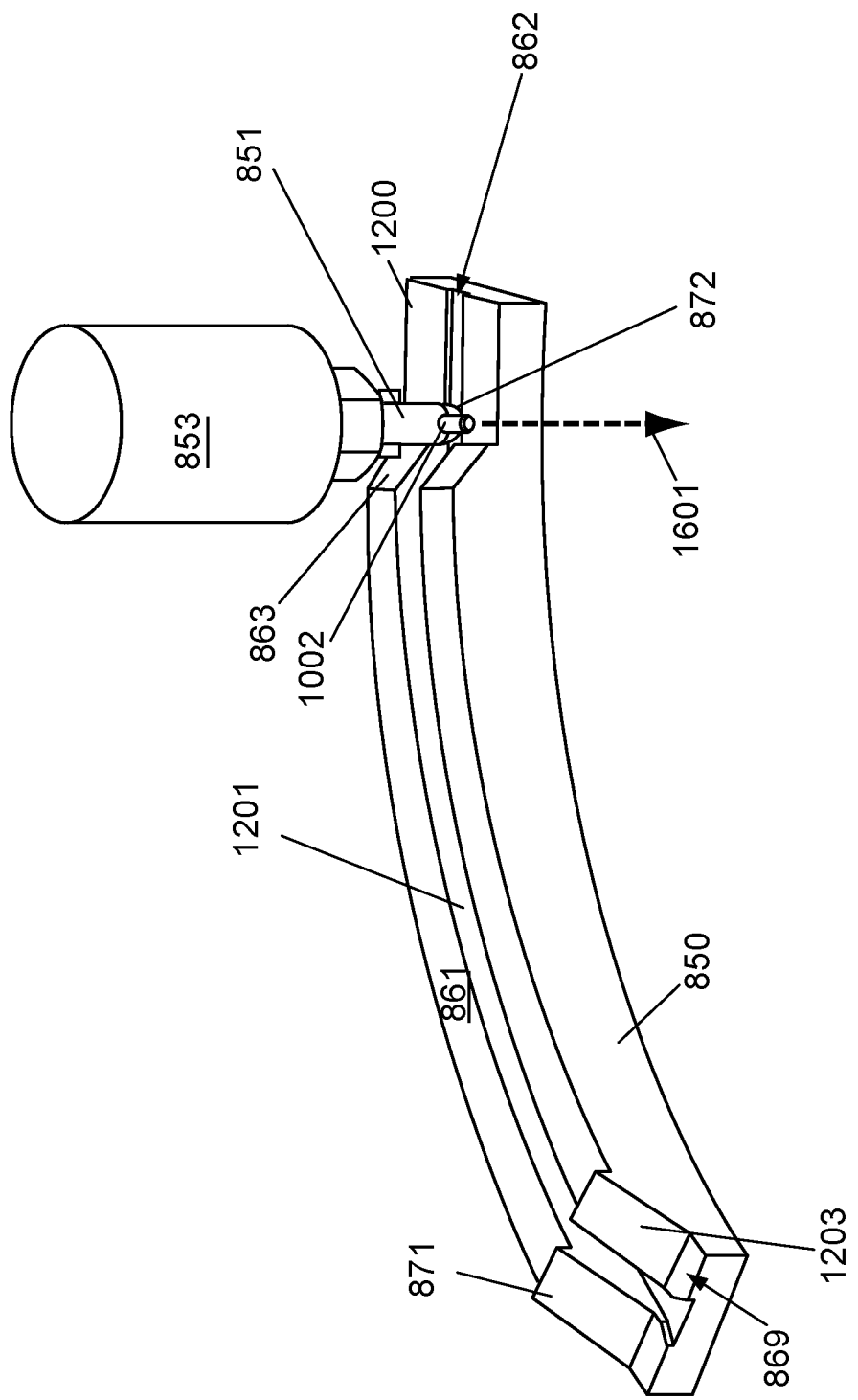

FIG. 16 depicts a perspective view of the locking pin in a locked position in the pin locking mechanism of a return pin path of the pin retaining device of FIG. 8, according to non-limiting implementations.

Figure 17:
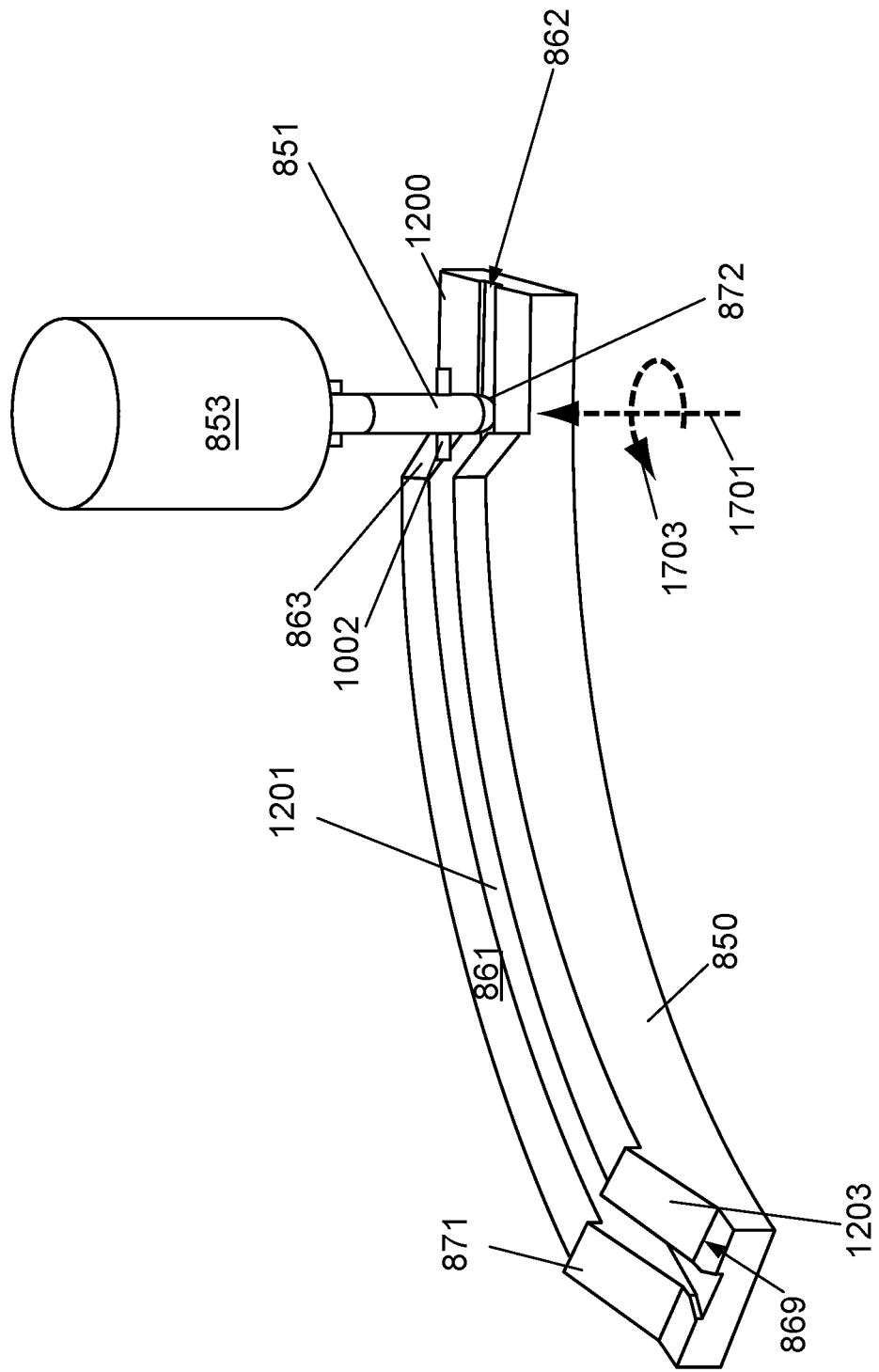

FIG. 17 depicts a perspective view of the locking pin being disengaged from the pin locking mechanism of the pin retaining device of FIG. 8, according to non-limiting implementations.

Figure 18:
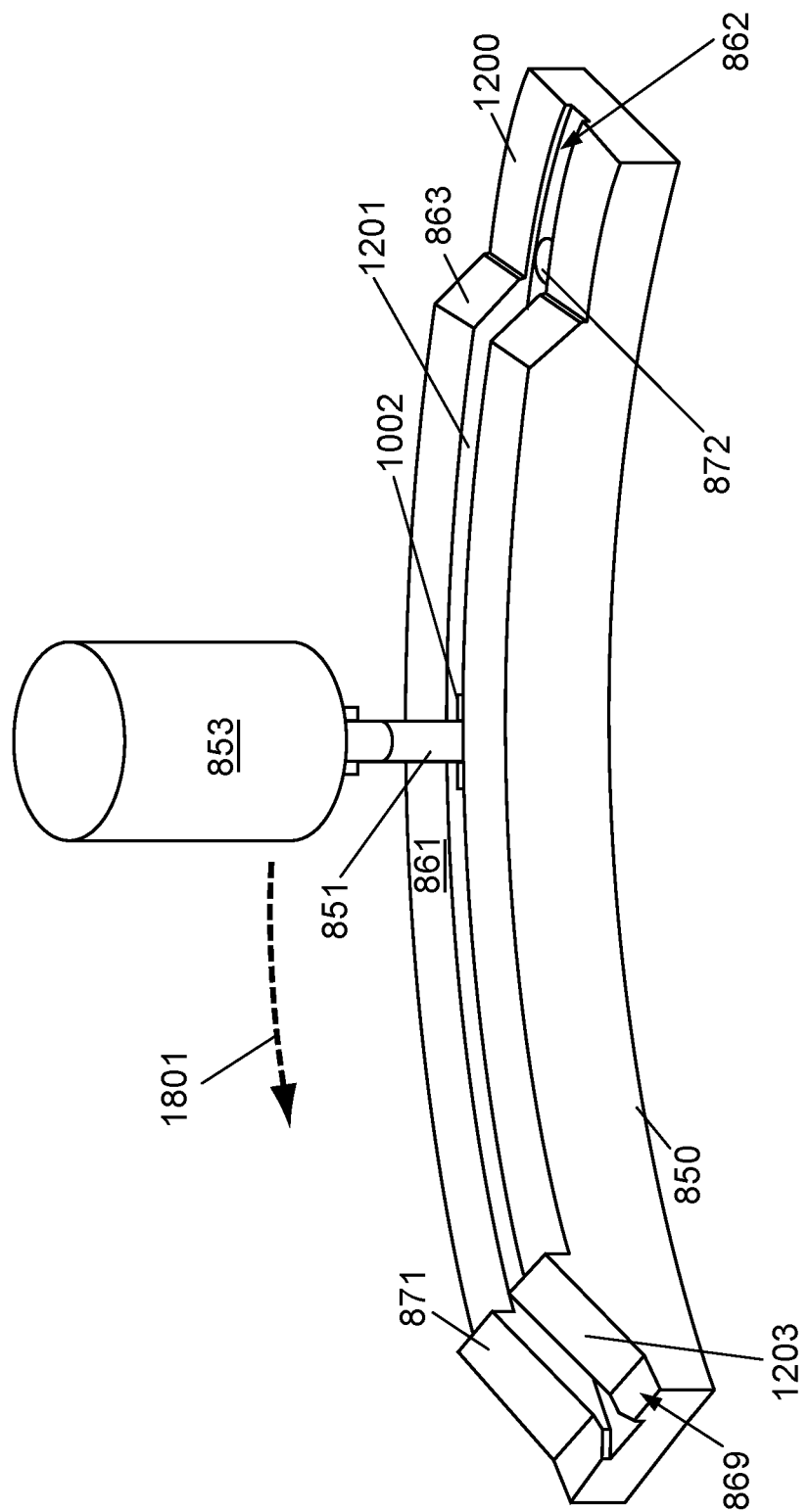

FIG. 18 depicts a perspective view of the locking pin rotating and/or sliding along the return pin path back towards a starting pin position of the pin retaining device of FIG. 8, according to non-limiting implementations.

Figure 19:
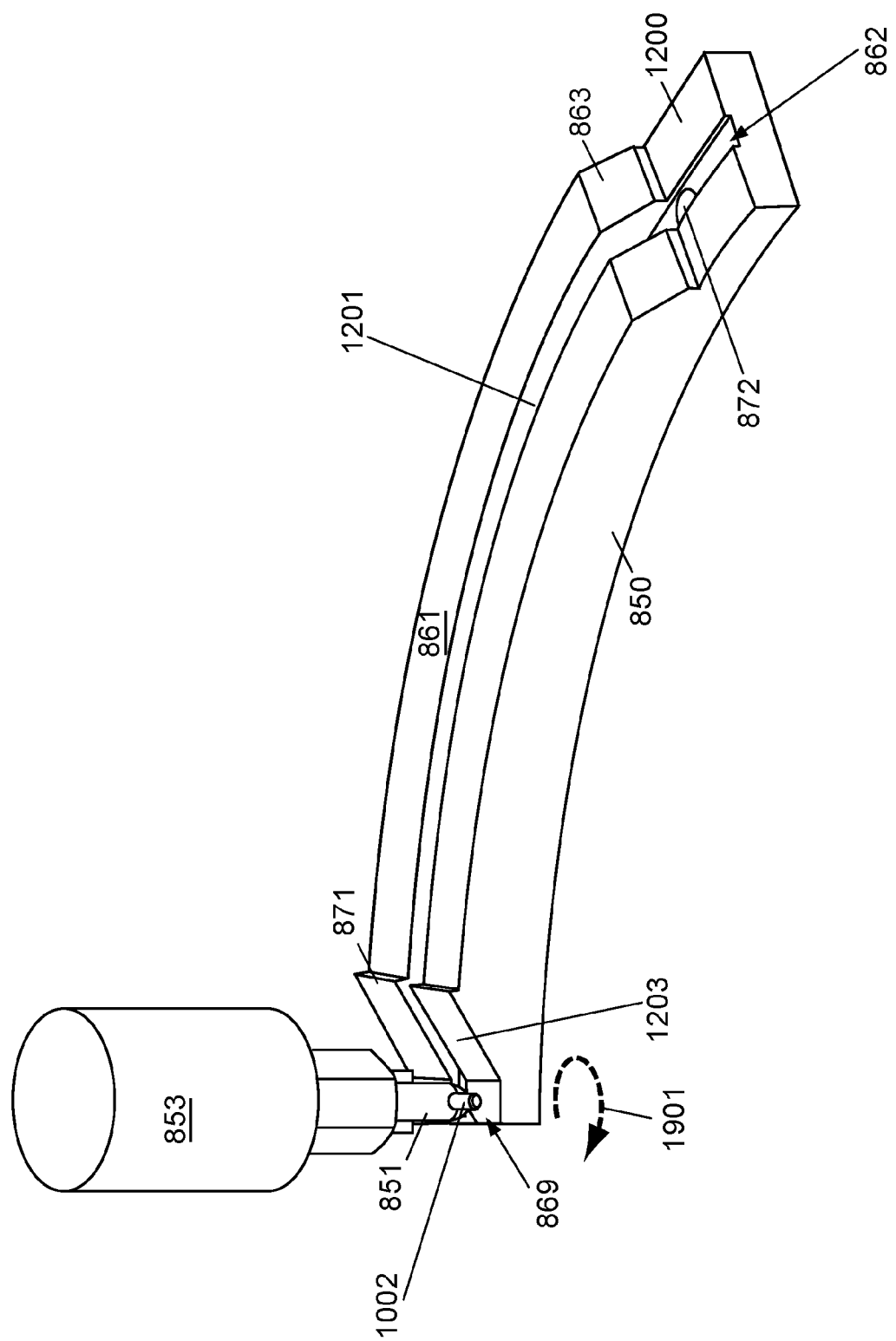

FIG. 19 depicts a perspective view of the locking pin being returned to the starting pin position of the pin retaining device of FIG. 8, according to non-limiting implementations.

DETAILED DESCRIPTION

Figure 1:
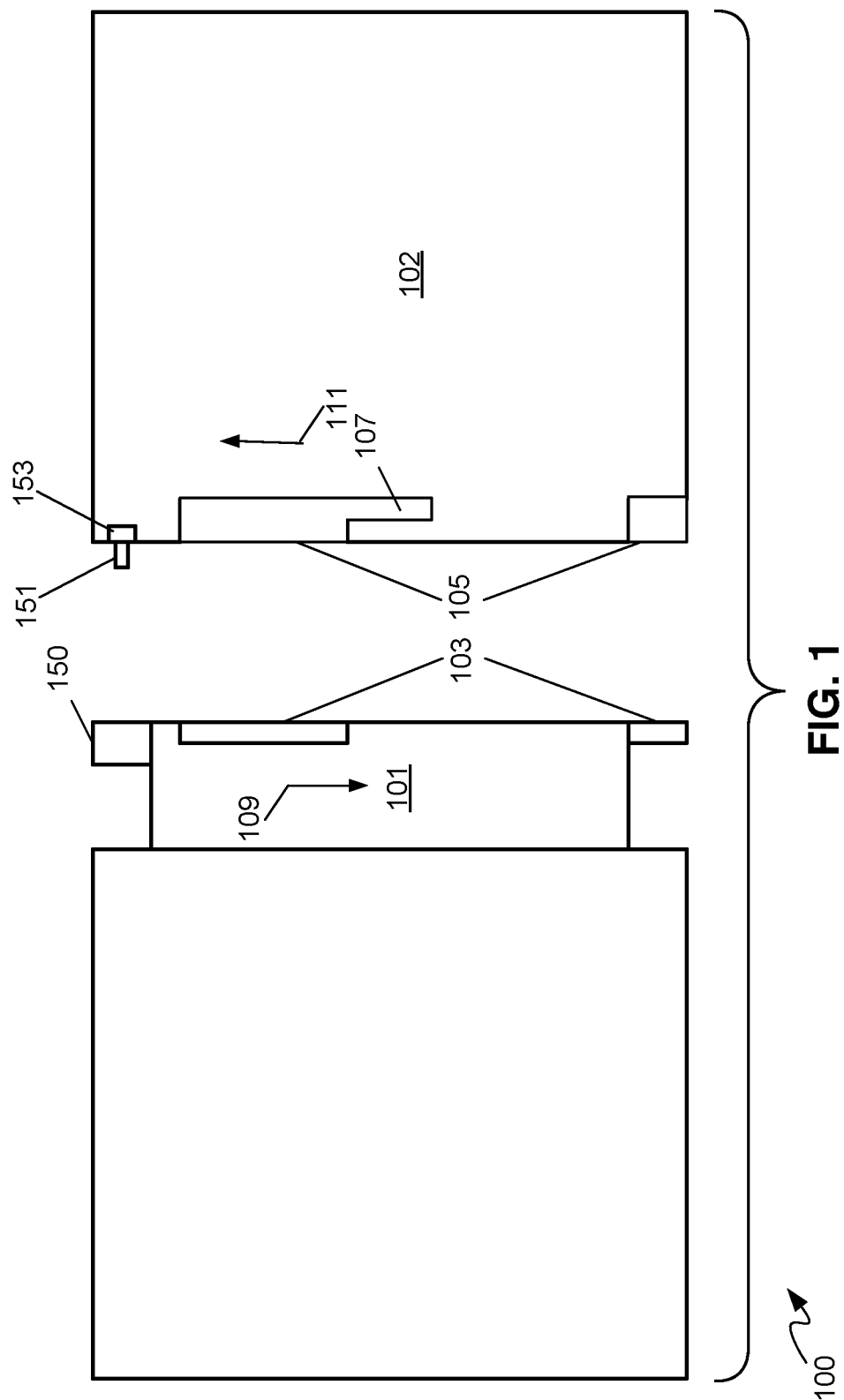
FIG. 1 depicts a system comprising a first portion and a second portion of a bayonet-style lens mount, including dual retention apparatus, according to non-limiting implementations.
Figure 2:
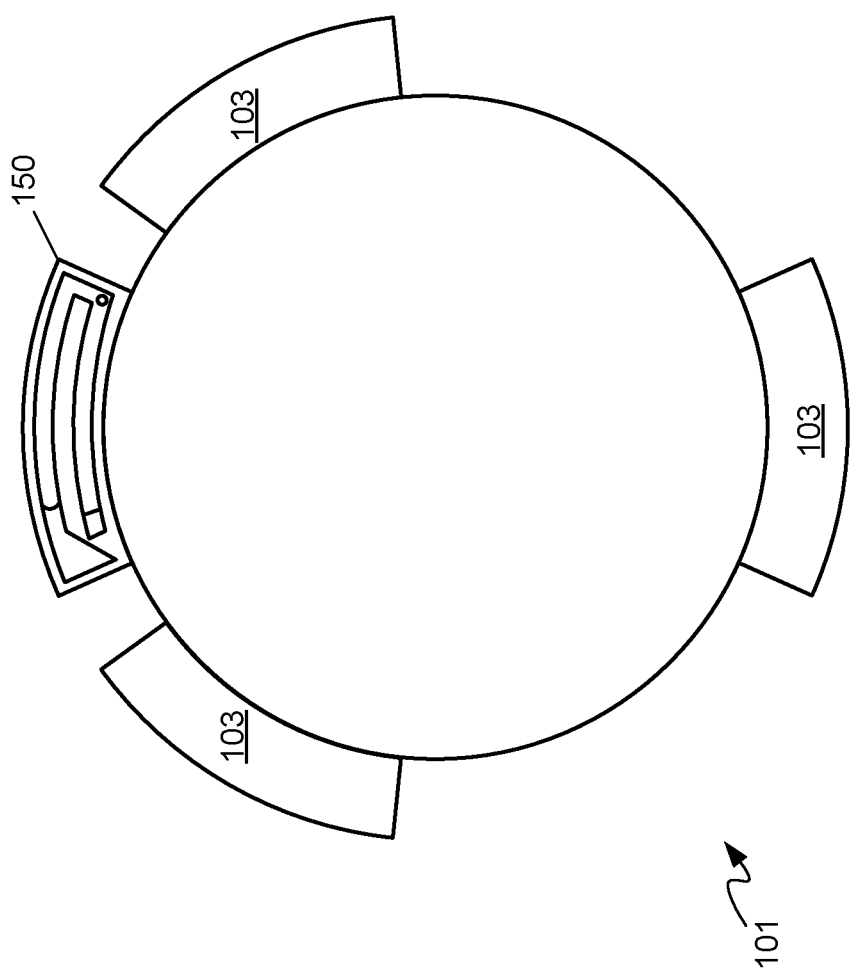
FIG. 2 depicts a front elevation view of the first portion of the system of FIG. 1, including a pin retaining device of the dual retention apparatus, according to non-limiting implementations.

FIG. 1 depicts an elevation side view of a system 100 comprising a first portion 101 and a second portion 102 of a bayonet-style lens mount, according to non-limiting implementations. FIG. 2 depicts a front elevation view of first portion 101, according to non-limiting implementations. As depicted, first portion 101 can comprise an interchangeable lens, and second portion 102 can comprise a lens mount, for example on a projector, a camera and the like, the lens mating and interlocking with the lens mount. Specifically first portion 101 and second portion 102 can comprise a bayonet-style lens mount. Hence, as depicted, each of portions 101, 102 can be generally cylindrical (though other shapes are within the scope of present implementations), and first portion 101 comprises one or more protrusions 103 extending radially outwards along a mating end of first portion 101, as best seen in FIG. 2. Second portion 102 comprises one or more apertures 105, and the like, in one-to-one relationship with (one or more) protrusions 103, and arranged to mate with protrusions 103. Connected to each aperture 105 is a respective groove 107 into which a respective protrusion 103 can slide and/or rotate, when first portion and second portion 102 are slid and/or rotated relative to one another, for example by rotating one or more of first portion 101 in a direction as represented by arrow 109 and second portion 102 in a direction as represented by arrow 111. Once each protrusion 103 is at least partially rotated and/or slid into a respective groove 107, first portion 101 is retained by second portion 102, even prior to first portion 101 and second portion 102 being in a locked position relative to one another. In some implementations, at least partial retention, prior to the locked position, can be achieved via frictional engagement of protrusions 103 by grooves 107.

As depicted, first portion 101 further comprises a pin retaining device 150, and second portion 102 comprises a locking pin 151 (interchangeably referred to hereafter as pin 151) biased by a biasing device 153 and located so that locking pin 151 aligns with a starting pin position on pin retaining device 150 when protrusions 103 are aligned with apertures 105, as described in further detail below. In other implementations, pin retaining device 150 can be located at second portion 102, and locking pin 151 can be located at first portion 101. Furthermore, while present implementations are described as locking pin 151 being biased by biasing device 153, in other implementations, biasing device 153 can bias pin retaining device 150 relative to locking pin 151; hence, in general, biasing device 153 biases locking pin 151 and pin retaining device 150 relative to one another, as described below. In any event, pin retaining device 150, locking pin 151 and biasing device 153 together are components of a dual retention apparatus as described hereafter.

Furthermore, each of pin retaining device 150, locking pin 151 and/or biasing device 153 can be integrated with one or more of portions 101, 102 and/or formed from similar material and/or one or more of portions 101, 102 can be modified to add each of pin retaining device 150, locking pin 151 and/or biasing device 153 thereto. In some implementations, pin retaining device 150 comprises metal and/or plastic and/or a material similar to a material of first portion 101. Similarly, a chassis of biasing device 153 comprises metal and/or plastic and/or a material similar to a material of second portion 102. Pin 151 can at least partially comprise from any material that can slide over materials of pin retaining device 150 including, but not limited to metals, plastics and the like.

Attention is next directed to FIG. 3, which depicts a front elevation view of pin retaining device 150 in more detail. Pin retaining device 150 comprises: a starting pin position 309; a pin locking mechanism 312; a partial pin locking mechanism 311; a pin path (in depicted implementations comprising a first path 301 and a connecting path 303) from starting pin position 309 to pin locking mechanism 312, partial pin locking mechanism 312 located on the pin path (i.e. first pin path 301 and connecting pin path 303) and configured to prevent locking pin 151 from sliding back towards starting pin position 309 and allowing locking pin 151 to slide towards pin locking mechanism 312 (as described in more detail with reference to FIGS. 6, 7A and 7B), pin locking mechanism 312 configured to lock locking pin 151 therein; and a pin return path 302 from pin locking mechanism 312 to starting pin position 309, pin return path 302 bypassing partial pin locking mechanism 311. Locking pin 151 is generally slidable along each &pin path 301, 303 and return pin path 302. Furthermore, biasing device 153 is configured to relatively bias locking pin 151 along at least a portion of pin path 301, 303 towards pin locking mechanism 312, and further bias locking pin 151 into pin locking mechanism 312. Biasing device 153 further biases locking pin 151 into partial pin locking mechanism 311, as described below. Pin path will be referred to hereafter as pin path 301, 303, as pin path comprises first pin path 301 and connecting path 303.

Furthermore each of pin path 301, 303 and return pin path 302 comprises grooves and the like configured to guide locking pin 151 therein, as locking pin 151 and pin retaining device 150 are rotated and/or slid, relative to one another. For example, pin retaining device 150 comprises a body having a face, and pin path 301, 303 and return pin path 302 comprises grooves in the face of the body.

As depicted, first pin path 301, comprises starting pin position 309 and partial locking mechanism 311, and return pin path 302 comprises: pin locking mechanism 312 and a pin return mechanism 315 configured to return locking pin 151 to starting pin position 309. As depicted (and as best seen in FIG. 4A and FIG. 4B described below) pin return mechanism 315 comprises a ramp located at an end of return pin path 302, the ramp configured to guide locking pin 151 to starting pin position 309 as locking pin 151 is sliding along return pin path 302. Further, as depicted, connecting pin path 303 is about perpendicular to each of first pin path 301 and the return pin path 302.

As depicted, first pin path 301 further comprises a tapered entry 320 configured to guide locking pin 151 from starting pin position 309 towards partial pin locking mechanism 311, as locking pin 151 slides along first pin path 301. Furthermore, partial pin locking mechanism 311 is located towards tapered entry 320 and/or starting pin position 309 relative to connecting pin path 303. In other words, partial pin locking mechanism 311 is located between tapered entry 320 and connecting pin path 303, and closer to tapered entry 320 relative to connecting pin path 303. However, in some implementations, partial locking mechanism 311 can be located along tapered entry 320.

Return pin path 302 comprises: a pin locking mechanism 312 configured to retain locking pin 151 as locking pin 151 is received from connecting pin path 303; and pin return mechanism 315 configured to return locking pin 151 to starting pin position 309 as locking pin 151 is sliding from pin locking mechanism 312 along return pin path 302. Furthermore, as depicted, pin locking mechanism 312 is located at an intersection of connecting pin path 303 and return pin path 302.

As will be further described hereafter, biasing device 153 is configured to relatively bias locking pin 151 along at least a portion of pin path 301, 303 towards pin locking mechanism 312, and further bias locking pin 151 into pin locking mechanism 312. For example, relative to FIG. 3, biasing device 153 biases devices in two directions: "into" the page (i.e. into first pin path 301, return pin path 302, and pin locking mechanism 312) and, from first pin path 301, along connecting pin path 303, to return pin path 302.

Attention is next directed to FIG. 4A and FIG. 4B which respectively depict a cross-section of first pin path 301 through line A-A of FIG. 3, and a cross-section of return pin path 302 through line B-B of FIG. 3. Turning first to Section A-A, it is apparent that, in these implementations, partial pin locking mechanism 311 comprises a step and/or a ledge and/or a discontinuity in pin path 301, 303, and specifically first pin path 301, a falling edge of the step being about parallel to a biasing direction of pin 151, so that as locking pin 151 slides along pin path 301, 303, biasing device 153 biases locking pin 151 towards and/or along the step, the step preventing locking pin 151 from sliding back towards starting pin position 309 once locking pin 151 slides past the step. In other words, as pin 151 slides from first pin path 301 to connecting path 303 (e.g. as first portion 101 and second portion 102 are being rotated and/or slid relative to one another), and as pin 151 is biased by biasing device into first pin path 301 (e.g. "down" with respect to each of FIG. 4A and FIG. 4B), as pin 151 slides from starting pin position 309 and past the step, pin 151 will extend further into first pin path 301 as compared to before the step; attempts (either manual and/or accidental and/or due to vibration) to slide and/or rotate pin 151 back towards starting pin position 309 will result in pin 151 hitting the step (e.g. the step blocks a return path of pin 151). Hence, once pin 151 slides past the step, first portion 101 is at least partially locked onto second portion 102.

Turning next to Section B-B, it is apparent that, in these implementations, pin locking mechanism 312 comprises a hole and/or aperture configured to receive locking pin 151. As depicted, the hole is generally cylindrical and/or circular in cross-section, however the hole can be other shapes, including, but not limited to square, triangular and the like in cross-section. In other words, as pin 151 slides along pin path 301, 303 to pin locking mechanism 312, as first portion 101 and second portion 102 are being rotated and/or slid relative to one another, and as biasing device 153 biases locking pin 151 along at least a portion of pin path 301, 303 towards pin locking mechanism 312, when pin 151 reaches connecting pin path 303, biasing device 153 causes pin 151 to automatically move along connecting pin path 303 to the hole of pin locking mechanism 312. As pin 151 is further biased into pin locking mechanism 312, pin 151 is received in the hole, and/or pin 151 engages the hole, when pin 151 is aligned therewith. Pin 151 being received in the hole prevents first portion 101 and second portion 102 from moving relative to one another. Hence, when pin 151 is received in the hole, first portion 101 and second portion 102 are in a locked position and/or pin 151 is in a locked position relative to pin retaining device 150.

From Section B-B, it is further apparent that pin return mechanism 315 comprises a ramp located at an end of return pin path 302 away from pin locking mechanism 312, the ramp configured to guide locking pin 151 to starting pin position 309 as locking pin 151 is sliding along return pin path 302, for example, as first portion 101 is being unlocked from second portion 102. However, in other implementations, the ramp can extend from any position along return pin path 302 to starting pin position 309. Movement of pin 151 relative to pin return mechanism 315 will be described in further detail below with reference to FIGS. 6, 7A and 7B.

Attention is next directed to FIG. 5, which depicts a perspective view of a schematic diagram of pin 151 and biasing device 153, in further detail. As depicted, pin 151 extends from biasing device 153 via a slot 500. Biasing device 153 comprises spring mechanisms 501, 503 respectively configured to bias pin 151 out of slot 500 (e.g. in a direction represented by arrow 511) and along slot 500 (e.g. in a direction represented by arrow 513). For example, slot 500 can act as a guide for pin 151 when pin 151 is moving in the direction of arrow 511 and/or in an opposite direction. Hence, when pin 151 and biasing device 153 are in the position shown in FIG. 1, spring mechanism 501 of biasing device 153 biases into pin locking mechanism 312, and spring mechanism 503 biases pin 151 along pin path 301, 303 towards pin locking mechanism 312. Hence, pin 151 is biased in two directions.

Biasing device 153 further comprises a chassis 515 within which spring mechanisms 501, 503 are contained (hence each of spring mechanisms 501, 503 are depicted in stippled lines indicating that spring mechanisms 501, 503 are contained inside chassis 515).

While not depicted, biasing device 153 and/or pin 151 further comprise apparatus for mating pin 151 to spring mechanisms 501, 503 so that spring mechanisms 501, 503 can bias pin 151. Spring mechanisms 501, 503 can be further connected to and/or retained by chassis 515.

FIG. 5 further depicts a button 520 on chassis 515 of biasing device 153, that is an external component of a pin unlocking mechanism to manually remove locking pin 151 from pin locking mechanism 312 so that locking pin 151 can slide along return pin path 302 towards pin return mechanism 315. In some alternative implementations, pin unlocking mechanism can be further configured to retract locking pin 151 into chassis 515 so that locking pin 151 can also bypass partial pin locking mechanism 311. While the pin unlocking mechanism is not depicted, in general, actuation of button 520 (e.g. manual actuation, and the like) will cause pin 151 to partially retract into biasing device 153, i.e. in a direction opposite arrow 511. In effect, actuation of button 520 works against spring mechanism 501 causing tension on spring mechanism 501 to compress. Furthermore, actuation of button 520 causes pin 151 to retract by a distance that causes pin 151 to disengage from pin locking mechanism 312, but where pin 151 continues to be engaged by return pin path 302. For example, pin 151 can be retracted by a distance that is larger than a depth of pin locking mechanism 312, but not greater than a combined depth of pin locking mechanism 312 and return pin path 302. Alternatively, actuation of button 520 causes pin 151 to retract by a distance that causes pin 151 to bypass partial locking mechanism 311, but where pin 151 continues to be engaged by pin path 301, 303. For example, pin 151 can be retracted by a distance enables pin 151 to slide past partial pin locking mechanism 311 when sliding along pin path 301, 303 towards starting pin position 309. Hence, in these implementations partial pin locking mechanism 311 can be bypassed when pin 151 is rotated past the step of first pin path 301, but not all the way to connecting pin path 303 by actuating button 520 and sliding pin 151 back towards starting pin position 309. While button 520 is depicted, pin unlocking mechanism can comprise any combination of actuators and devices for disengaging pin 151 from pin locking mechanism and/or retracting pin 151 into biasing device 153.

Attention is next directed to FIGS. 6, 7A and 7B which depict relative positions of pin 151 at pin retaining device 150 as first portion 101 and second portion 102 rotate and/or slide relative to one another. FIGS. 6, 7A and 7B are similar to FIGS. 3, 4A and 4B respectively, with like elements having like numbers. When first portion 101 is initially mated with second portion 102, in an unlocked position, pin 151 is located at starting pin position 309 as pin retaining device 150 and pin 151 are each respectively located on portion 101, 102 so that such an alignment will occur, for example during manufacture of portions 101, 102. As portions 101, 102 are rotated and/or slid relative to one another, pin 151 slides, relative to pin retaining device 150, from starting pin position 309, along tapered entry 320, to position 602, just prior to partial pin locking mechanism 311. As pin 151 continues to slide past partial pin locking mechanism 311, as pin 151 is biased by biasing device 153 into pin path 301, 303, pin 151 is biased further into pin path 301, 303 at position 603, as best seen in FIG. 7A. Hence, when first portion 101 and second portion 102 are rotated and/or slid back towards the unlocked position, when pin 151 is located between partial pin locking mechanism 311 and connecting pin path 303, pin 151 interacting with the step of partial pin locking mechanism 311 will prevent first portion 101 and second portion 102 from reaching the unlocked position. In some implementations, pin 151 can be retracted into biasing device 153 to slide pin 151 back along pin path 301, 303 towards starting pin position 309, presuming pin 151 has not yet reached connecting path 303, and portions 101, 102 can be moved back to a starting position.

However, partial pin locking mechanism 311 does not prevent pin 151 from being rotated and/or slid towards connecting pin path 303 to a position 604. From position 604, biasing device 153 biases pin 151 along connecting pin path 303 towards return pin path 302 and/or pin locking mechanism 312, to position 605.

At position 605, which is coincident with pin locking mechanism 312, biasing device 153 biases pin 151 into pin locking mechanism 312. Hence, at position 605, pin 151 is in a locked position in pin locking mechanism 312 and, similarly, portions 101, 102 are in a locked position relative to one another: while protrusions 103 are retained by respective grooves 107 so that second portion 102 retains first portion 101, pin 151 being engaged by pin locking mechanism 312 locks portions 101, 102 from moving relative to one another.

In other words, locking pin 151, pin retaining device 150, and biasing device 153 can each be components of a bayonet-style lens mount, as depicted in FIG. 1, partial pin locking mechanism 311 preventing a lens in a bayonet-style lens mount from rotating back to an unlocked position, and pin locking mechanism 312 locking the lens in the bayonet-style lens mount into a locked position, as described above.

To unlock pin 151 from pin locking mechanism 312, the pin unlocking mechanism is actuated, for example using button 520, which lifts pin 151 out of the hole of pin locking mechanism 312. Portions 101, 102 can then be rotated and/or slid back towards the unlocked position; either a a wall of return pin path 302 that connects return pin path 302 to connecting pin path 303, or a another stop position, can prevent portions 101, 102 from being rotated and/or slid past the locking position. Further, as pin 151 is biased along pin path 301 towards pin locking mechanism 312, pin 151 remains along return pin path 302 after being disengaged from pin locking mechanism 312. Hence a user can only rotate and/or slide portions 101, 102 towards the unlocked position, for example towards position 606 along return pin path 302, just prior to pin return mechanism 315. Hence, as pin 151 slides along return pin path 302, partial pin locking mechanism 311 is bypassed.

As portions 101, 102 continue to be rotated and/or slid towards the unlocked position, pin 151 is forced to retract back into biasing device 153 by the ramp of pin return mechanism 315, as shown at position 607.

As best shown in FIG. 6, pin 151 then slides from pin return mechanism 315 and back into starting pin position 309, where portions 101, 102 can be disengaged from one another as, when pin 151 is located at starting pin position 309, protrusions 103 and apertures 105 are aligned.

In other words, return pin path 302 and starting pin position 309 are located along a same path so that as pin 151 slides out of return pin path 302, pin 151 next slides to starting pin position 309. Indeed, between an end of pin return mechanism 315 and starting pin position 309 is a surface of pin retaining device 150 over which an end of pin 151 can slide so that when pin 151 reaches starting pin position 309, biasing device 153 biases pin back into starting pin position 309.

FIGS. 7A and 7B further show that starting pin position 309 and a first portion of the pin path 301, 303 prior to partial pin locking mechanism 311, are on a first level, and a remainder of pin path 301, 303 and return pin path 302, other than pin return mechanism 315, are on a second level deeper and/or lower than the first level. Furthermore, pin return mechanism 315 is further configured to return locking pin 151 from the second level to at least the first level as locking pin 151 slides there along. Indeed, as depicted, pin return mechanism 315 brings pin 151 to a level that is greater than the first level of starting pin position 309, and pin 151 is biased towards the level of starting pin position 309 when pin 151 is rotated and/or slid towards starting pin position 309.

FIGS. 6, 7A and 7B further show that first pin path 301 and return pin path 302 are substantially concentric so that locking pin 151 slides in a first direction along first pin path 301, then along connecting pin path 303 to return pin path 302, and then in a second direction, opposite the first direction, along return pin path 302 back to starting pin position 309. For example, as depicted, each of first pin path 301 and return pin path 302 comprise respective concentric cam slots (e.g. at least pin return mechanism 315 comprises a cam).

Furthermore, as depicted, connecting pin path 303 is about perpendicular to each of first pin path 301 and return pin path 302; however, in other implementations, connecting pin path 303 need not be perpendicular to each of first pin path 301 and return pin path 302, as long as biasing device 153 relatively biases pin 151 along connecting pin path 303 towards return pin path 302.

Hence, FIGS. 2-7 depict an apparatus in which a single locking pin travels between two concentric cam slots connected at one end, to provide a dual retention apparatus for a lens in a bayonet-style lens mount. The locking pin enters a first cam slot via a tapered entry profile and engages a step at the preliminary lock position (i.e. partial pin locking mechanism 311) (with minimal lens rotation), thus preventing the lens from vibrating out of the lens mount if it is not fully rotated to the final lock position. When the lens is fully rotated, the locking pin enters the second cam slot where it engages a final lock position (i.e. pin locking mechanism 312). The locking pin is spring loaded in two directions (e.g. into the cam slots and towards the second cam slot and/or towards a center of the lens), allowing the locking pin to travel between the cam slots and engage the locking positions automatically. A ramp at the exit of the upper cam slot depresses the lock pin, allowing the lens to be removed with a single press of a release button.

Persons skilled in the art will appreciate that there are yet more alternative implementations and modifications possible. For example, while biasing device 153 is depicted as biasing pin 151 towards pin retaining device 150, biasing device 153 can one or more of bias: pin 151 towards pin retaining device 150; and pin retaining device 150 towards pin 151. Indeed, one or more biasing devices can be used for the biasing. For example, a first biasing device can bias pin towards pin retaining device 150, and a second biasing device can bias pin retaining device 150 so that pin 151 is biased along connecting pin path 303 towards return pin path 302. In other words, one or more of pin 151 and pin retaining device 150 can be biased, to provide the relative biasing.

In depicted implementations, each of first pin path 301 and return pin path 302 are substantially arc-shaped sharing a common center, as portions 101, 102 are configured to rotationally slide relative to one another, and biasing device 153 biases device towards the common center to bias pin 151 towards pin locking mechanism 612 along connecting path 303 towards pin locking mechanism 312. However, in other implementations, where two portions lock together using linear sliding, each of first pin path 301 and return pin path 302 can be substantially linear. In other words, while as depicted locking pin 151, pin retaining device 150, and biasing device 153 are each components of a bayonet-style lens mount, in other implementations, locking pin 151, pin retaining device 150, and biasing device 153 can be implemented into other types of circular or linear mounting and/or mating devices.

Furthermore, while as depicted, first pin path 301 and return pin path 302 are substantially arc-shaped sharing a common center, and first pin path 301 is further from the common center, in other implementations, the positions of first pin path 301 and return pin path 302 can be reversed, in an about mirror image of with return pin path 302 being further from the common center. However, in these implementations, biasing device 153 biases pin 151 away from the common centre to bias pin 151 from first pin path 301 outwards along connecting path 303 towards pin locking mechanism 312.

In yet further implementations pin path 301, 303 can comprise an arc and/or a curved path from starting pin position 309 to pin locking mechanism 312, and return pin path 302 can comprise another arc and/or another curved path from pin locking mechanism 312 to starting pin position 309. In other words, in these implementations, first path 301 and connecting path 303 form a continuous path without an abrupt change in angle as depicted in present implementations. Either of pin path 301, 303 or return pin path 302 can be in an outwards most position from a common center.

Attention is next directed to FIG. 8 which depicts a perspective view of another implementation of a dual retention apparatus, according to alternative non-limiting implementations. Specifically, FIG. 8 depicts apparatus 800 comprising a pin retaining device 850, a locking pin 851 (interchangeably referred to hereafter as pin 851), and a biasing device 853. Locking pin 851 is slidable in pin retaining device 850, which comprises a pin path 861 from a starting pin position 869 to a pin locking mechanism 872, with a partial pin locking mechanism 871 located on pin path 861 configured, to prevent locking pin 851 from sliding back towards starting pin position 869 and allowing locking pin 851 to slide towards pin locking mechanism 872. Pin locking mechanism 872 is configured to lock locking pin 851 therein. Pin return path 862 is from pin locking mechanism 872 to starting pin position 869, pin return path 862 bypassing partial pin locking mechanism 871.

As described below with reference to FIG. 10, pin 851 comprises shaft and a cross portion. Hence, more specifically, pin retaining device 850 comprising: starting pin position 869; pin locking mechanism 872; partial pin locking mechanism 871; pin path 861 from starting pin position 869 to pin locking mechanism 872, partial pin locking mechanism 871 located on pin path 861 and configured to prevent locking pin 851 from sliding back towards starting pin position 869 and allowing locking pin 851 to slide towards pin locking mechanism 872, pin locking mechanism 872 configured to lock locking pin 851 therein. Pin path 861 further comprises one or more of a ramp 863 and a step (as depicted a ramp) from the surface to pin locking mechanism 872. Pin retaining device 850 further comprises pin return path 862 from pin locking mechanism 872 to starting position, pin return path 862 bypassing partial pin locking mechanism 871. More specifically, return pin path 862 comprises a ledge located after pin locking mechanism 872 and a slot in the surface of pin path 861, pin locking mechanism 872 located in the ledge, the slot running from pin locking mechanism 872 to starting pin position 869. While, as depicted, a bottom of the slot comprises a groove in the ledge, in other implementations, a bottom of the slot and a surface of the ledge can be at the same level and/or height. The slot is configured to receive: a tip of the shaft of pin 851 as the cross portion is sliding along the surface of pin path 861; and the shaft of pin 851 when locking pin 851 is sliding along return pin path 862 towards starting pin position 869, the slot being substantially perpendicular to the step. Biasing device 852 is configured to rotationally bias the cross pin of pin 851 to be about parallel to the step, as described in further detail below, as well as bias pin 851 into pin locking mechanism 872. In some implementations of portions 101, 102, pin retaining device 850, locking pin 851, and biasing device 853 can respectively replace pin retaining device 150, locking pin 151, and biasing device 153. As such, pin retaining device 850 is curved and/or arc-shaped, similar to pin retaining device 150.

Furthermore each of pin retaining device 850, pin 851, and biasing device 853 can comprise similar materials to pin retaining device 150, pin 151, and biasing device 153 and/or can be attached and/or integrated with portions 101, 102 in a similar manner.

Attention is next directed to FIG. 9, which depicts a cross-section of pin retaining device 850 through line C-C of FIG. 8 and/or through/bisecting return pin path 862. From FIG. 9 it is apparent that pin path 861 between partial pin locking mechanism 871 and ramp 863 is on a first level, and that starting pin position 869 and return pin path 862 are on a second level lower than the first level on FIG. 9, and that a tapered entry on pin path 861 leads from starting pin position 869 to partial pin locking mechanism 871, which as depicted comprises a step to the first level, and that ramp 863 leads from the first level to the second level.

Attention is next directed to FIG. 10, which depicts an exploded view of locking pin 851 and biasing device 853, according to non-limiting implementations. In these implementations, locking pin 851 comprises a cross pin comprising a shaft 1001 and a cross portion 1002 about perpendicular to shaft 1001; As depicted, pin 851 further comprises an external back-drivable ball screw thread. Biasing device 853 comprises: a drive nut 1003 that comprises an internal, back-drivable ball screw thread that mates with the threads of shaft 1001; a pin cap 1005 that mounts to and/or mates with drive nut 1003 and/or pin 851; a torsion spring 1007, a pin-side of which provides torsional and/or rotational force on pin cap 1005 to rotate drive nut 1003 and pin 851, torsion spring 1007 providing at least about a 90° range rotation to pin 851; a torsion washer 1009 comprising external hex flats and further receives a non-pin side of torsion spring 1007; a compression spring 1011 configured to provide linear spring motion to pin 851; anti-rotate keys 1013; and a chassis 1015 containing internal components of biasing device 853, anti-rotate keys 1013 being fixed in position by chassis 1015 and further in contact with external flats of torsion washer 1009 to prevent torsion washer 1009 from rotating.

Hence, biasing device 853 provides biasing in two directions: into pin locking mechanism 872; and rotationally around shaft 1001. Specifically, as will be describe below, biasing device 853 rotationally biases cross portion 1002 to be about parallel to a step of partial pin locking mechanism 871, as describe below.

Attention is next directed to FIG. 11, which depicts a pin unlocking mechanism 1101 interacting with biasing device 853. When a fork structure of pin unlocking mechanism 1101 is actuated against drive nut 1003 (e.g. via a manual actuation of pin unlocking mechanism 1101), pin 851 is forced to travel linearly against compression spring 1011 until force exceeds friction in the ball screw thread. Drive nut 1003 travels along pin 851, causing pin 851 to rotate about 90° against the force of torsion spring 1007. When torsional rotation has reached end of travel, pin 851 continues to travel linearly. In some implementations, pin unlocking mechanism 1101 can be further configured to retract pin 851 to bypass partial pin locking mechanism 871 when pin 851 is being rotated and/or slid along pin path 861 towards starting pin position 869; in some implementations, a tip of pin 851 remains engaged with a slot of return pin path 862, as described below, but the cross portion clears the step of partial pin locking mechanism 871, while in other implementations the tip of pin 851 clears the slot (i.e. actuation of pin unlocking mechanism 1101 causes pin 851 to clear the slot entirely).

Attention is next directed to FIGS. 12-19, which depict a sequence showing pin 851 interacting with pin retaining device 850 to dually retain pin 851 in two positions. Each of FIGS. 12-19 is substantially similar to FIG. 8, with like elements having like numbers, though from different perspectives. Furthermore, it is assumed in FIGS. 12-19 that pin retaining device 850 is positioned at and/or attached to portion 101 of FIG. 1, instead of pin retaining device 150, and that biasing device 853, and pin 851, are positioned at and/or attached to portion 102 of FIG. 1, instead of biasing device 153, and pin 151. However, in alternative implementations, biasing device 853 can be mounted to first portion 101 and pin retaining device 850 can be mounted to second portion 102. Regardless, as portions 101, 102 are rotated and/or slide with respect to one another, pin 851 rotates and/or slides along pin path 861, and return pin path 862, as will be described hereafter.

As will also become apparent, in these implementations, pin path 861 comprises a surface along which cross portion 1002 slides, and partial pin locking mechanism 871 comprises a step in the surface preventing cross portion 1002 from sliding back towards starting pin position 869 once locking pin 851 slides past the step.

As will further become apparent, in these implementations, return pin path 862 comprising a ledge 1200 located after ramp 863 and a slot 1201 in pin path 861 (i.e. slot 1201 and return pin path 862 are coincident), pin locking mechanism 872 located in ledge 1200, slot 1201 running from starting pin position 869 to pin locking mechanism 872. Slot 1201 configured to receive: a tip of pin 851, as cross portion 1002 is sliding along the surface of pin path 861; and shaft 1001 when locking pin 851 is sliding along return pin path 862 towards starting pin position 869, slot 1201 being substantially perpendicular to the step. For example, a tip of pin 851 slides in slot 1201 as cross portion 1002 slides across pin path 861 perpendicular to slot 1201, cross portion 1002 preventing pin 851 from otherwise fully extending into slot 1201.

As will also become apparent, in these implementations, ramp 863 comprises a ramp from the surface of pin path 861 to ledge 1200. Furthermore, pin locking mechanism 872 comprises a hole located in return pin path 862, and specifically in ledge 1200, the hole being otherwise similar to the hole of locking pin mechanism 312.

FIG. 12 depicts a starting position of pin 851 relative to pin retaining device 850, according to non-limiting implementations, for example in which protrusions 103 are aligned and mated with apertures 105 of respective portions 101, 102. In general, pin 851 is of a length that positions a tip of pin 851 is positioned at about starting pin position 869, however, the tip of pin 851 need not make contact with pin path 861 at starting pin position 869. Furthermore, cross portion 1002 is positioned to be about perpendicular to slot 1201 at starting pin position 869.

As pin 851 is rotated and/or slid relative to pin retaining device 850, as indicated by arrow 1250 (i.e. as portions 101, 102 are rotated and/or slid relative to one another towards a locking position), cross portion 1002 contacts the surface of pin path 861, and specifically a tapered entry 1203 located between starting pin position 869 and partial pin locking mechanism 871, as depicted in FIG. 13. FIG. 13 also illustrates that an entrance to slot 1201, at starting pin position 869, is chamfered, though such chamfering is optional, and other shapes of slot 1201 are within the scope of present implementations. In any event, tapered entry 1203 exerts force on cross portion 1002 to so that pin 851 linearly retracts into biasing device 853, in a direction shown by arrow 1301. As depicted in FIG. 14, as pin 851 continues to be rotated and/or slid relative to pin retaining device 850 (i.e. as portions 101, 102 are rotated and/or slid relative to one another towards a locking position), cross portion 1002 reaches partial pin locking mechanism 861 and biasing device 853 biases device towards and/or into pin path 861, in a direction shown by arrow 1401. The step of partial pin locking mechanism 871, then prevents pin 851 from rotating and/or sliding back towards starting pin position 869, as the step blocks a return path of cross portion 1002, similar to the step of partial pin locking mechanism 311 blocking a return path of pin 151. In some implementations, as described above, pin unlocking mechanism 1101 can be engaged to to retract pin 851 to bypass partial pin locking mechanism 871 and pin 851 can be rotated and/or slid back along pin path 861 towards starting pin position 869.

As depicted in FIG. 15, pin 851 continues to be rotated and/or slid relative to pin retaining device 850 (i.e. as portions 101, 102 are rotated and/or slid relative to one another towards a locking position), and along the surface of pin path 861 until, as depicted in FIG. 16, cross portion 1002 reaches ramp 863 and biasing device 853 biases pin 851 along ramp 863 to return pin path 862, and into pin locking mechanism 872, as indicated by arrow 1601. In this position, portions 101, 102 are locked relative to one another, and/or in the locked position, and pin 851 is locked in position relative to pin retaining device 850.

Attention is next directed to FIG. 17, which depicts pin 851 after being removed and/or disengaged from pin locking mechanism. While not depicted in FIG. 17, it is assumed that pin unlocking mechanism 1101 has been actuated; specifically, pin unlocking mechanism 1101 is configured to remove locking pin 851 from pin locking mechanism 872 and rotate cross portion 1002 by about 90° so that cross portion 1002 can enter slot 1201 along return pin path 862. Hence, actuation of pin unlocking mechanism 1101 simultaneously lifts pin 851 from the hole of pin locking mechanism 872, and rotates pin 851 by about 90°, as shown indicated by arrow 1701 (lifting) and arrow 1703 (rotating). Furthermore, pin unlocking mechanism 1101 lifts pin 851 a distance that causes pin 851 to disengage from the hole, and causes cross portion 1002, when rotated, to be aligned with slot 1201. The distance that pin is raised is hence greater than a depth of the hole of pin locking mechanism 872, but less than a combined perpendicular distance from a bottom of the hole to the surface of first pin path 301. In other words, when lifted pin 851 is positioned to slide along slot 1201 with cross portion 1002 being located between a floor of return pin path 862 and a pin path 861.

In FIG. 17, it is assumed that portions 101, 102 are now unlocked relative to one another, and portions 101, 102 can be rotated and/or slid back towards an unlocked position. Indeed, attention is now directed to FIG. 18, where it is further assumed that portions 101, 102 are being rotated and/or slid back towards the unlocked position, in a direction of arrow 1801. Hence, as cross portion 1002 slides and/or rotates through slot 1201, in about the 90° position, allowing cross portion 1002 to bypass partial pin locking mechanism 871 without being engaged thereby, back to starting pin position 869, as depicted in Fig. Furthermore, as also depicted in FIG. 19, once pin 851 exits slot 1201, torsion spring 1007 returns cross portion 1002 to its original position so that cross portion 1002 prevents pin 851 from re-entering slot 1201 (i.e. pin 851 is rotated in the direction of arrow 1901). Portions 101, 102 can then be uncoupled from one another as when pin 851 is located at starting pin position 869, protrusions 103 are aligned with apertures 105.

Furthermore, similar to implementations depicted in FIGS. 2 to 11: biasing device 853 one or more of biases: locking pin 851 towards pin retaining device 850; and pin retaining device 850 towards locking pin 851; pin path 861 comprises tapered entry 1203 configured to guide locking pin 851 from starting pin position 869 towards partial pin locking mechanism 871, as locking pin 851 slides along pin path 861; partial pin locking mechanism 871 is located towards starting pin position 869 on pin path 861; partial pin locking mechanism 871 comprises a step in pin path 861, the step being about parallel to pin locking mechanism 872 so that as locking pin 851 slides along pin path 861, biasing device 853 biases locking pin 851 towards the step, the step preventing locking pin 851 from sliding back towards starting pin position 869 once locking pin 851 slides past the step; pin locking mechanism 872 comprises a hole (of any suitable shape as described above) configured to receive locking pin 851; and pin locking mechanism 872 is located at an intersection of pin path 861 and return pin path 862.

Furthermore, apparatus 800 further comprises a pin unlocking mechanism 1101 configured to manually remove locking pin 851 from pin locking mechanism 872 so that locking pin 851 can slide along return pin path 862 towards starting pin position 869. Pin unlocking mechanism 1101 can be further configured to manually bypass partial pin locking mechanism 871 so that locking pin 851 can slide along pin path 861 towards starting pin position 869.

Each of pin path 861, pin path 861 and return pin path 862 can be at least partially arc-shaped. However, in other implementations return pin path 862 can be substantially linear.

As depicted, pin path 861 and return pin path 862 are substantially concentric so that locking pin 851 slides in a first direction along pin path 861 towards the locking mechanism, then along return pin path 862 from the locking mechanism back to starting pin position 869. Hence, locking pin 851, pin retaining device 850, and biasing device 853 can each be components of a bayonet-style lens mount, partial pin locking mechanism 871 preventing a lens in the bayonet-style lens mount from rotating back to an unlocked position, and pin locking mechanism 872 locking the lens in the bayonet-style lens mount into a locked position. For example, each of pin path 861 and return pin path 862 can comprise respective concentric cam slots.

Hence, while mechanically different, both of the apparatus depicted in FIGS. 2 to 7, and apparatus 800 depicted in FIGS. 8 to 19 have similar functionality, in that each provides a partial pin locking mechanism that both prevents a pin from being moved back along a first path (unless manually, and optionally, disengaged there from), but allows the pin to move forward to a pin locking mechanism, where the pin is engaged, until being disengaged. Furthermore, once the pin is disengaged, the pin bypasses the partial pin locking mechanism by sliding along a second path to a starting position.

Persons skilled in the art will appreciate that there are yet more alternative implementations and modifications possible, and that the above examples are only illustrations of one or more implementations. The scope, therefore, is only to be limited by the claims appended hereto.

What is claimed is:
1. An apparatus comprising:
a locking pin;
a pin retaining device, the locking pin slidable therein, comprising: a starting pin position; a pin locking mechanism; a partial pin locking mechanism; a pin path from the starting pin position to the pin locking mechanism, the partial pin locking mechanism located on the pin path and configured to prevent the locking pin from sliding back towards the starting pin position and allowing the locking pin to slide towards the pin locking mechanism, the pin locking mechanism configured to lock the locking pin therein; and a return pin path from the pin locking mechanism to the starting position, the return pin path bypassing the partial pin locking mechanism, the partial pin locking mechanism comprises a step in the pin path, the step being parallel to the pin locking mechanism so that as the locking pin slides along the pin path, the biasing device biases the locking pin towards the step, the step preventing the locking pin from sliding back towards the starting pin position once the locking pin slides past the step; and,
a biasing device configured to relatively bias the locking pin along at least a portion of the pin path towards the pin locking mechanism, and further bias the locking pin into the pin locking mechanism.

2. The apparatus of claim 1, wherein:
the pin path comprises: a first pin path, comprising the starting pin position, and a connecting pin path connecting the first pin path to the return pin path; and, the return pin path comprises: the pin locking mechanism, and a pin return mechanism configured to return the locking pin to the starting pin position.

3. The apparatus of claim 2, wherein the pin return mechanism comprises a ramp located at an end of the return pin path, the ramp configured to guide the locking pin to the starting pin position as the locking pin is sliding along the return pin path.

4. The apparatus of claim 2, wherein the connecting path is perpendicular to each of the first pin path and the return pin path.

5. The apparatus of claim 1, wherein the biasing device biases the locking pin towards the pin retaining device or the biasing device biases the pin retaining device towards the locking pin.

6. The apparatus of claim 1, wherein the pin path comprises a tapered entry configured to guide the locking pin from the starting pin position towards the partial pin locking mechanism, as the locking pin slides along the pin path.

7. The apparatus of claim 1, wherein the partial pin locking mechanism is located towards the starting pin position on the pin path.

8. The apparatus of claim 1, wherein the pin locking mechanism comprises a hole configured to receive the locking pin.

9. The apparatus of claim 1, wherein the pin locking mechanism is located at an intersection of the pin path and the return pin path.

10. The apparatus of claim 1, further comprising a pin unlocking mechanism configured to manually remove the locking pin from the pin locking mechanism so that the locking pin can slide along the return pin path towards the starting pin position.

11. The apparatus of claim 10, wherein the pin unlocking mechanism is further configured to manually bypass the partial pin locking mechanism so that the locking pin can slide along the pin path towards the starting pin position.

12. The apparatus of claim 1, wherein each of the pin path and the return pin path are substantially linear.

13. The apparatus of claim 1, wherein each of the pin path and the return pin path are at least partially arc-shaped.

14. The apparatus of claim 1, wherein the pin path and the return pin path are substantially concentric so that the locking pin slides in a first direction along the pin path towards the locking mechanism, then along the return pin path from the locking mechanism back to the starting pin position.

15. The apparatus of claim 1, wherein, the locking pin, the pin retaining device, and the biasing device are each components of a bayonet-style lens mount, the partial pin locking mechanism preventing a lens in the bayonet-style lens mount from rotating back to an unlocked position, and the pin locking mechanism locking the lens in the bayonet-style lens mount into a locked position.

16. The apparatus of claim 1, wherein each of the pin path and the return pin path comprise respective concentric cam slots.

17. The apparatus of claim 1, wherein the starting pin position and a first portion of the pin path, prior to the partial pin locking mechanism, are on a first level, and a remainder of the pin path and at least a portion of the return pin path, are on a second level deeper than the first level.

18. The apparatus of claim 17, further comprising a pin return mechanism on the return pin path configured to return the locking pin from the second level to the first level as the locking pin slides there along.

19. The apparatus of claim 1, wherein:

the locking pin comprises a shaft and a cross portion;

the pin path comprises: a surface along which the cross portion slides, the partial pin locking mechanism comprises a step in the surface preventing the cross portion from sliding back towards the starting pin position once the locking pin slides past the step; and one or more of a ramp and a step from the surface to the pin locking mechanism;

the return pin path comprises a ledge located after the pin locking mechanism and a slot in the pin path, the pin locking mechanism located in the ledge, the slot running from the pin locking mechanism to the starting pin position, the slot configured to receive: a tip of the shaft as the cross portion is sliding along the surface of the pin path; and the shaft when the locking pin is sliding along the return pin path towards the starting pin position, the slot being substantially perpendicular to the step;

the biasing device is further configured to rotationally bias the cross portion to be parallel to the step; and, the apparatus further comprises a pin unlocking mechanism configured to remove the locking pin from the pin locking mechanism and rotate the cross portion 90° so that the cross portion can enter the slot along the return pin path.

20. An apparatus comprising:

a locking pin;

a pin retaining device, the locking pin slidable therein, comprising: a starting pin position; a pin locking mechanism; a partial pin locking mechanism; a pin path from the starting pin position to the pin locking mechanism, the partial pin locking mechanism located on the pin path and configured to prevent the locking pin from sliding back towards the starting pin position and allowing the locking pin to slide towards the pin locking mechanism, the pin locking mechanism configured to lock the locking pin therein; and a return pin path from the pin locking mechanism to the starting position, the return pin path bypassing the partial pin locking mechanism, the pin path and the return pin path are substantially concentric so that the locking pin slides in a first direction along the pin path towards the locking mechanism, then along the return pin path from the locking mechanism back to the starting pin position; and, a biasing device configured to relatively bias the locking pin along at least a portion of the pin path towards the pin locking mechanism, and further bias the locking pin into the pin locking mechanism.

\* \* \* \* \*